(12) United States Patent
Malov et al.

(10) Patent No.: US 8,775,286 B2
(45) Date of Patent: Jul. 8, 2014

(54) SYSTEM AND METHOD FOR MANAGEMENT OF FINANCIAL PRODUCTS PORTFOLIO USING CENTRALIZED PRICE AND PERFORMANCE OPTIMIZATION TOOL

(75) Inventors: Denis Malov, Scottsdale, AZ (US); Sricharan Poundarikapuram, Scottsdale, AZ (US)

(73) Assignee: SAP AG, Walldorf (DE)

( * ) Notice: Subject to any disclaimer, the term of this patent is extended or adjusted under 35 U.S.C. 154(b) by 928 days.

(21) Appl. No.: 12/565,527

(22) Filed: Sep. 23, 2009

(65) Prior Publication Data
US 2011/0071857 A1 Mar. 24, 2011

(51) Int. Cl.
*G06Q 40/00* (2012.01)
(52) U.S. Cl.
USPC .............................................. 705/35; 705/38
(58) Field of Classification Search
USPC ........................................................ 705/35
See application file for complete search history.

(56) References Cited

U.S. PATENT DOCUMENTS 6,963,854 B1 * 11/2005 Boyd et al. ...................... 705/37
2003/0046130 A1 * 3/2003 Golightly et al. ................. 705/7

* cited by examiner

*Primary Examiner* — Eric T Wong
*Assistant Examiner* — John Anderson
(74) *Attorney, Agent, or Firm* — Buckley, Maschoff & Talwalkar LLC

(57) ABSTRACT

A computer-implemented method controls commercial transactions involving a portfolio of financial products by conducting business operations related to commercial transactions between a bank and consumer involving purchase and utilization of the financial products, collecting transactional data related to the financial products, and providing a centralized modeling and optimization tool to predict customer response to changes in an attribute of a financial product under evaluation based on the transactional data and to optimize the variable of the financial product under evaluation. The modeling and optimization tool is configurable to evaluate the financial products in the portfolio under KPIs and business rules selected according to the financial product under evaluation. The optimized variable is transmitted to the bank. The movement and utilization of the financial products between the customer and bank is controlled in accordance with the predicted customer response to changes in the optimized variable of the financial product.

23 Claims, 16 Drawing Sheets

FIG. 9

Selection Criteria
Product Type: Credit Card    Rule Type: Movement Rules ▽

Business Rule List
View: Standard View  [Print Version] [Export ▼] [Creat...]

| Rule Set Name | Product Type Description | Created by | Created on |

Movement Rules
Associated Segment Rules
Associated Variable Rules

[Search]
Filter Settings

FIG. 12

Variable Rule Parameters
Product Type: Credit Card
Variable Rules Name: Rate gt Reward Rule Set Variables

| First Variable | Unit | Second Variable | Unit | First Variable Scale | Second Variable Scale | BR Relationship | Gap Value |
|---|---|---|---|---|---|---|---|
| Rate ▼ | % | Reward ▼ | % | 1.00 | 1.00 | Greater Than Or Equals ▼ | -0.50 |
| ▼ | | ▼ | | 0.00 | 0.00 | ▼ | 0.00 |
| | | | | 0.00 | 0.00 | ▼ | 0.00 |

200

Movement Rule Parameters

Product Type: Credit Card ⌄

Movement Rules Name: ⌄

} 202

| Rule Set Variables | | | | |
|---|---|---|---|---|
| Variable Name | Max move up | Unit | Max move down | Unit |
| Rate | 0.50 | % | 0.50 | % |
| Reward | 0.50 | % | 0.50 | % |
| Fee | 50.00 | USD | 50.00 | USD |

Segment Rule Parameters

Product Type       Credit Card
Segment Rule Name  ASR CST CRSC CH
Rule Set Variables Rate ⌄

} 212

Attribute List

| Attribute Name | Rule Type | Movement Direction |
|---|---|---|
| Product | | |
| Customer Type | Gap | Move Down |
| Credit Score | Pricing | Move Down |
| Channel | Pricing | Move Up |
| Credit Limit | | |

214

Gap Value

| Attribute Group | Attribute Ranges | Gap Value | Unit |
|---|---|---|---|
| ASR: All Channel | Mail TO Internet | 0.25 | % |
| ASR: Channel N/A | Channel Leaf N/A | 0.0 | % |

| Pricing Segment | Market Group Name | Product | Customer Type | Credit Score | Channel | Credit Limit | Optimal Rate (%) | Optimal Reward (%) | Optimal Fee (USD) |
|---|---|---|---|---|---|---|---|---|---|
| 0000000001 | Virginia | CC | Classic | Fair | Mail | $000-005k | 15.40 | 1.97 | 60.00 |
| 0000000002 | Virginia | CC | Gold | Fair | Mail | $000-005k | 14.36 | 2.26 | 75.00 |
| 0000000003 | Virginia | CC | Platinum | Fair | Mail | $000-005k | 16.52 | 2.99 | 100.23 |
| 0000000004 | Virginia | CC | Classic | Good | Mail | $000-005k | 13.52 | 1.97 | 60.00 |
| 0000000005 | Virginia | CC | Gold | Good | Mail | $000-005k | 12.44 | 2.36 | 75.00 |
| 0000000006 | Virginia | CC | Platinum | Good | Mail | $000-005k | 14.31 | 3.11 | 125.00 |
| 0000000007 | Virginia | CC | Classic | Excellent | Mail | $000-005k | 10.31 | 2.30 | 60.00 |
| 0000000008 | Virginia | CC | Gold | Excellent | Mail | $000-005k | 9.38 | 2.22 | 75.00 |
| 0000000009 | Virginia | CC | Platinum | Excellent | Mail | $000-005k | 11.13 | 2.97 | 125.00 |
| 0000000010 | Virginia | CC | Classic | Fair | Internet | $000-005k | 16.50 | 1.78 | 75.00 |
| 0000000011 | Virginia | CC | Gold | Fair | Internet | $000-005k | 15.82 | 2.10 | 90.00 |
| 0000000012 | Virginia | CC | Platinum | Fair | Internet | $000-005k | 17.76 | 3.07 | 115.39 |
| 0000000013 | Virginia | CC | Classic | Good | Internet | $000-005k | 14.56 | 1.75 | 75.00 |

*FIG. 16*

| Pricing Segment | Market Group Name | Product | Customer Type | Credit Score | Channel | Credit Limit | Current Rate (%) | User Rate (%) | Current Reward (%) |
|---|---|---|---|---|---|---|---|---|---|
| 0000000001 | Virginia | CC | Classic | Fair | Mail | $000-005k | 15.42 | 15.40 | 1.44 |
| 0000000002 | Virginia | CC | Gold | Fair | Mail | $000-005k | 14.86 | 14.36 | 1.79 |
| 0000000003 | Virginia | CC | Platinum | Fair | Mail | $000-005k | 16.77 | 16.52 | 2.34 |
| 0000000004 | Virginia | CC | Classic | Good | Mail | $000-005k | 13.49 | 13.52 | 1.42 |
| 0000000005 | Virginia | CC | Gold | Good | Mail | $000-005k | 12.67 | 12.44 | 1.83 |
| 0000000006 | Virginia | CC | Platinum | Good | Mail | $000-005k | 14.81 | 14.31 | 2.46 |
| 0000000007 | Virginia | CC | Classic | Excellent | Mail | $000-005k | 10.43 | 10.31 | 1.65 |
| 0000000008 | Virginia | CC | Gold | Excellent | Mail | $000-005k | 9.88 | 9.38 | 1.57 |
| 0000000009 | Virginia | CC | Platinum | Excellent | Mail | $000-005k | 11.63 | 11.13 | 2.32 |
| 0000000010 | Virginia | CC | Classic | Fair | Internet | $000-005k | 17.00 | 16.50 | 1.13 |
| 0000000011 | Virginia | CC | Gold | Fair | Internet | $000-005k | 16.32 | 15.82 | 1.45 |
| 0000000012 | Virginia | CC | Platinum | Fair | Internet | $000-005k | 18.26 | 17.76 | 2.42 |
| 0000000013 | Virginia | CC | Classic | Good | Internet | $000-005k | 15.08 | 14.58 | 1.10 |

*FIG. 17*

SYSTEM AND METHOD FOR MANAGEMENT OF FINANCIAL PRODUCTS PORTFOLIO USING CENTRALIZED PRICE AND PERFORMANCE OPTIMIZATION TOOL

FIELD OF THE INVENTION

The present invention relates in general to economic modeling and, more particularly, to a system and method for managing multiple key performance indicators (KPIs) of financial products and services using a centralized price and performance optimization and modeling tool.

BACKGROUND OF THE INVENTION

Economic and financial optimization and planning is commonly used to estimate or predict and forecast the performance and outcome of real systems, given specific sets of input data of interest. An economic-based system will have many variables, agents, and influences that determine its behavior and performance. In one sense, it is relatively straightforward, in the past tense, to review historical data, understand its past performance, and state with relative certainty that the system's past behavior was indeed driven by the historical data. A much more difficult task, but one that is extremely valuable, is to generate a mathematical model of the system which predicts with high degree of certainty how the system will behave or would have behaved, with different sets of data and assumptions. While forecasting and fitting using different sets of input data is inherently imprecise, i.e., no model can achieve 100% certainty, the field of probability and statistics has provided many tools which allow such predictions to be made with reasonable certainty and acceptable levels of confidence.

In its basic form, the economic model can be viewed as a predicted or anticipated outcome of a mathematical expression, as driven by a given set of input data and assumptions. The input data is processed through the mathematical expression representing either the expected or current behavior of the real system. The mathematical expression is formulated or derived from principles of probability and statistics, often by analyzing historical data and corresponding known outcomes, to achieve a best fit of the expected behavior of the system to other sets of data, both in terms of forecasting and fitting. In other words, the model should be able to predict the outcome or response of the system to a specific set of data being considered or proposed, within a level of confidence, or an acceptable level of uncertainty.

Economic modeling has many uses and applications. One emerging area in which modeling has exceptional promise is the financial services industry. Banks, credit unions, savings and loan, commercial lenders, investment houses, and brokerage firms face stiff competition for limited customers and business. Most if not all financial services institutions make every effort to maximize sales, volume, revenue, and profit. Economic modeling can be an effective tool in helping management to achieve these important goals.

One modeling tool of use to financial services institutions involves estimating pricing sensitivities or elasticities of consumers' demand for financial products, such as depository products, loans, mortgages, credit cards, investments, and insurance contracts. The process of setting pricing components of the financial contracts, such as interest rates, applicable fees, durations, penalties, and balances, is an essential task for financial services institutions that can determine most granular characteristics of underlying portfolios performances. Some large institutions have used sophisticated analytics and modeling to understand demand trends and uncover areas of profit opportunity. Automated pricing software represents a movement toward greater precision in the pricing process. The software relies on complex demand models to estimate customers' attitudes toward pricing and the sensitivities of demand from historical sales data. The demand models create parameters which can be used to optimize pricing practices for each portfolio segment level and to generate portfolio performance analysis and forecasts.

The financial services institution typically offers a large portfolio of financial products. Each financial product and service has its own unique set of attributes and variables that control pricing and demand. Attributes are the criteria that define a financial product or pricing segment, such as the credit score of the customer or term of the instrument. Variables are the price defining values of the financial product, such as interest rates, reward points, and fees that can be changed to impact KPIs. Each category of financial products and services in the large portfolio is managed by a different group or person within the institution. In most cases, there is little cross-over between the different categories of financial products and services in terms of modeling resources and management strategies. The upper management of the financial services institution sets the targets and goals for each financial product manager toward the institution's overall business plan. Yet, the implementation to achieve the directives remains largely up to the product manager's discretion. In other words, each product manager develops his or her own strategy and utilizes available resources according to the unique set of attributes associated with the financial products and services in his or her care. The financial services institution must maintain a variety of dedicated or specialized modeling resources, each as requested by the different product managers, to meet the goals. In some cases, the product manager must use a modeling resource which is not necessarily optimized for their responsible products and services. The use of dedicated or specialized modeling resources adds costs to the management process and reduces potential profitability due to the lack of correlation between the modeling resources and coordination between the product managers.

SUMMARY OF THE INVENTION

A need exists for a centralized modeling and optimization tool for optimizing each of the financial products and services within a portfolio managed by a financial services institution. Accordingly, in one embodiment, the present invention is a computer-implemented method of controlling commercial transactions involving a portfolio of financial products comprising the step of conducting business operations related to commercial transactions between a bank and consumer involving purchase and utilization of financial products in a portfolio. The business operations involve a financial commerce system interconnected with hard-wired or wireless communication lines. The method further includes the steps of collecting transactional data related to the portfolio of financial products, and providing a centralized modeling and optimization tool to predict customer response to changes in an attribute of a financial product under evaluation based on the transactional data and to optimize the attribute of the financial product under evaluation. The centralized modeling and optimization tool is configurable to evaluate each of the financial products in the portfolio under KPIs and business rules selected according to the financial product under evaluation. The optimized attribute of the financial product under evaluation is transmitted to the bank. The movement and utilization of the financial products between the customer and bank is controlled in accordance with the predicted customer response to changes in the optimized attribute of the financial product.

In another embodiment, the present invention is a computer-implemented method of controlling commercial transactions involving a portfolio of financial products comprising the steps of conducting business operations related to commercial transactions involving purchase and utilization of financial products in a portfolio between members of a financial commerce system, collecting transactional data related to the portfolio of financial products, and providing a centralized modeling and optimization tool to predict member response to changes in an attribute of a financial product under evaluation based on the transactional data and to optimize the attribute of the financial product under evaluation. The centralized modeling and optimization tool is configurable to evaluate each of the financial products in the portfolio under KPIs and business rules selected according to the financial product under evaluation. The optimized attribute of the financial product under evaluation is transmitted to a member of the financial commerce system. The movement and utilization of the financial products between the members of the financial commerce system is controlled in accordance with the predicted response to changes in the optimized attribute of the financial product.

In another embodiment, the present invention is a computer program product comprising computer readable program code embodied in a computer usable medium. The computer readable program code is adapted to implement a method of controlling commercial transactions involving a portfolio of financial products comprising the steps of conducting business operations related to commercial transactions involving purchase and utilization of financial products in a portfolio between members of a financial commerce system, collecting transactional data related to the portfolio of financial products, and providing a centralized modeling and optimization tool to predict member response to changes in an attribute of a financial product under evaluation based on the transactional data and to optimize the attribute of the financial product under evaluation. The centralized modeling and optimization tool is configurable to evaluate each of the financial products in the portfolio under KPIs and business rules selected according to the financial product under evaluation. The optimized attribute of the financial product under evaluation is transmitted to a member of the financial commerce system. The movement and utilization of the financial products between the members of the financial commerce system is controlled in accordance with the predicted response to changes in the optimized attribute of the financial product.

In another embodiment, the present invention is a system for controlling commercial transactions involving a portfolio of financial products comprising a financial commerce system having a plurality of members each having a control system for controlling movement and utilization of financial products between the members. A database is in electronic communication with the financial commerce system for recording transactional data related to movement of financial products between the members of the financial commerce system. A computer is in electronic communication with the financial commerce system and provides a centralized modeling and optimization tool to predict member response to changes in an attribute of a financial product under evaluation based on the transactional data and to optimize the attribute of the financial product under evaluation. The centralized modeling and optimization tool is configurable to evaluate each of the financial products in the portfolio under KPIs and business rules selected according to the financial product under evaluation. The optimized attribute of the financial product under evaluation controls movement and utilization of the financial products between the members of the financial commerce system in accordance with the predicted response to changes in the optimized attribute of the financial product.

BRIEF DESCRIPTION OF THE DRAWINGS

FIG. 9 is a user interface screen for creation and modification of business rules used to constrain the centralized modeling and optimization tool;

FIG. 10 is a user interface screen for creation and modification of movement rules;

FIG. 11 is a user interface screen for creation and modification of associated segment rules;

FIG. 12 is a user interface screen for creation and modification of associated variable rules;

FIG. 16 is a user interface screen for a rate sheet for a pricing event with optimal rate, optimal reward, and optimal fee;

FIG. 17 is a user interface screen showing user override options for the rate sheet;

DETAILED DESCRIPTION OF THE DRAWINGS

Figure 1:
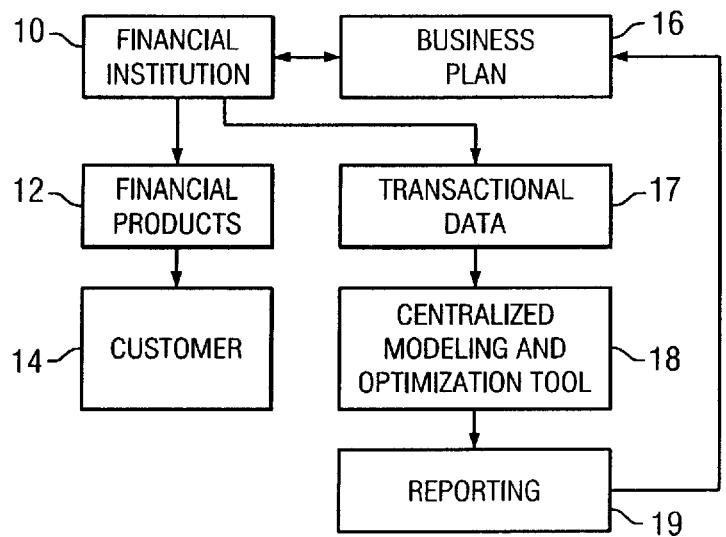
FIG. 1 is a block diagram of a financial services system.

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Economic and financial modeling and planning is an important business tool that allows companies to conduct business planning, forecast demand, and optimize prices and promotions to meet profit and/or revenue goals. Economic modeling is applicable to many businesses, such as financial institutions, manufacturing, distribution, wholesale, retail, investing, pricing of options, value of risk, research and development, and the like. In the face of mounting competition and high expectations from investors, most if not all businesses must look for every advantage they can muster in maximizing market share and profits. The ability to forecast demand, in view of pricing and promotional alternatives, and to consider other factors which materially affect overall revenue and profitability is vital to the success of the bottom line, and the fundamental need to not only survive but to prosper and grow.

In particular, economic modeling is essential to businesses that face thin profit margins, such as banks and other financial services institutions. Many businesses are interested in economic modeling and forecasting, particularly when the model provides a high degree of accuracy or confidence, as well as configurability and flexibility. Such information is a powerful tool and highly valuable to the business.

The present discussion considers economic modeling and optimization as applied to the financial services industry. In particular, the model provides insight into the cause and effect behind customer behavior and decisions to purchase and utilize financial products, such as money deposits, loans, interest rates, and econometric environment, and individual product attributes, such as term, liquidity, penalties, cannibalization, seasonal patterns, and promotions. The model provides an understanding of consumer behavior and decisions which is necessary to increase the profitability of the financial services institution. The present modeling and optimization system addresses effective modeling techniques for various financial products, in terms of forecasting and backcasting, and provides tools for a successful, scientific approach to programs with a high degree of confidence and configurability.

Financial services institutions, such as banks, credit unions, savings and loan, mortgage companies, credit card issuers, insurance providers, commercial lenders, investment houses, and brokerage firms, offer a wide portfolio of long-term and short-term financial products to consumers. These financial products include money deposits, interest-bearing checking accounts, consumer loans, commercial loans, and investment services. The financial services institutions conduct countless transactions each business day and collect volumes of transactional data. With proper modeling, the historical transactional data can provide useful information as to consumer buying and utilization decisions, patterns, behavior, and influence of external factors.

In FIG. 1, a financial services institution (bank) 10 offers certain financial product lines and services 12 available to customers 14 as part of its business plan 16. The product lines and services 12 include savings accounts, money market deposit accounts (MMDA), certificates of deposit (CD), interest bearing checking, consumer loans, commercial loans, credit cards, insurance, and investment options. Bank 10 has the ability to set pricing, fix interest rates, offer promotions and incentives, collect and maintain historical transactional data, and adjust its strategic business plan 16. The management team of bank 10 is held accountable for market share, profits, and overall success and growth of the business. While the present discussion is directed to a bank, it is understood that the modeling, promotional, and optimization tools described herein are applicable to other financial services institutions having similar goals, constraints, and needs. The terms financial product and financial service are understood to be interchangeable.

Bank 10 has business or operational plan 16. Business plan 16 includes many planning, analyzing, and decision-making steps and operations. Business plan 16 gives bank 10 the ability to evaluate performance and trends, make strategic decisions, set interest rates, formulate and run promotions, hire employees, expand branches, add and remove product lines, and the like. Business plan 16 allows bank 10 to analyze data, evaluate alternatives, run forecasts, and make operational decisions. Bank 10 can change business plan 16 as needed.

From business plan 16, bank 10 provides certain observable transactional data and assumptions 17, and receives back specific forecasts, predictions, and reporting from centralized modeling and optimization tool 18. The transactional data originates from day-to-day financial transactions involving financial products 12 between bank 10 and customer 14. Transactional data 17 includes customer attributes, relevant financial products, interest rates, terms, promotions, date and time, and branch. Centralized modeling and optimization tool 18 performs a series of complex calculations and mathematical operations to predict and forecast financial products 12 of bank 10. The output of modeling and optimization tool 18 is a report, chart, table, or other analysis 19, which represents the model's forecasts and predictions based on the model parameters and the given set of data and assumptions. Report 19 is made available to business plan 16 so that bank 10 can make operational decisions.

Figure 2:
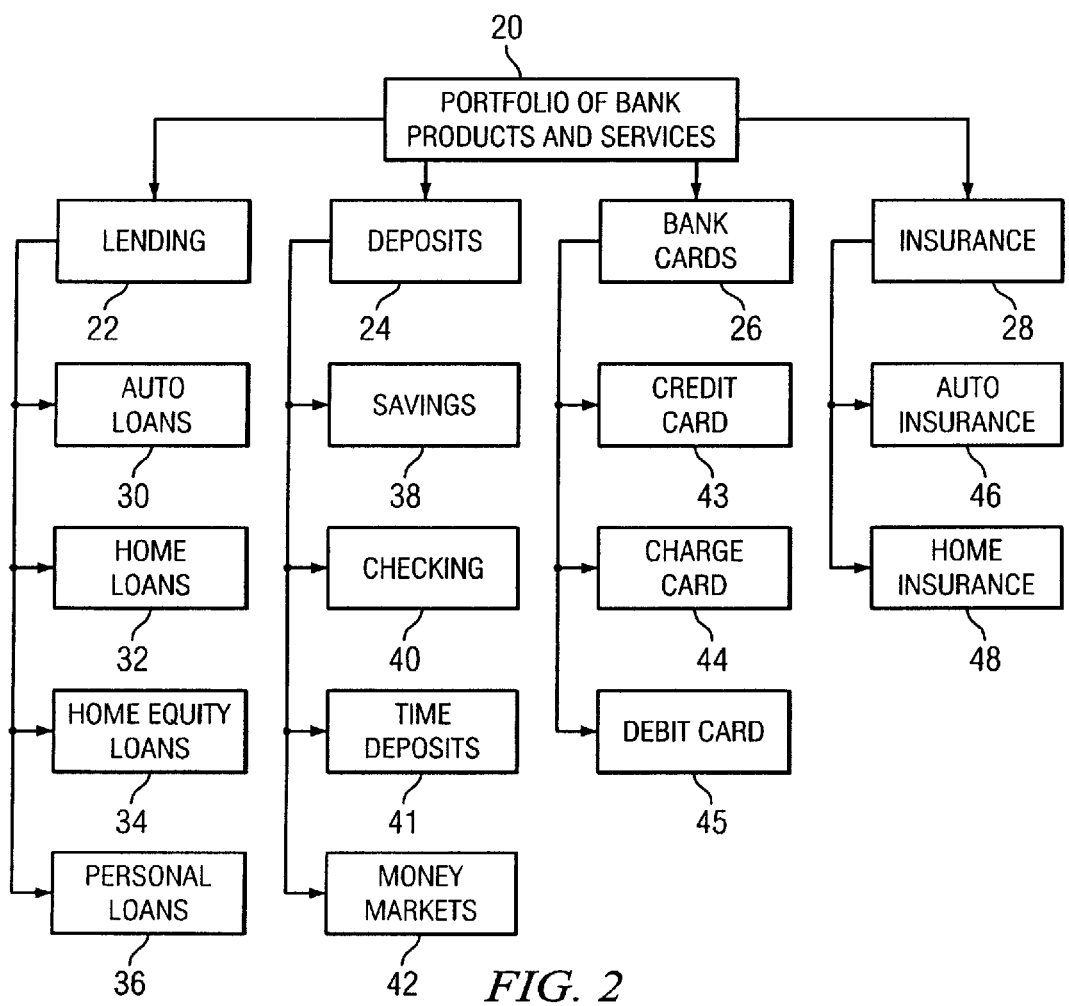
FIG. 2 illustrates a portfolio of financial products managed by a financial services institution.

FIG. 2 illustrates a portfolio of products 20 offered by bank 10. Portfolio 20 has several general categories or branches including lending 22, deposits 24, bank cards 26, and insurance 28. Lending branch 22 has financial products for auto loans 30, home loans 32, home equity loans 34, and personal loans 36. Deposits branch 24 has financial products for savings 38, checking 40, time deposits 41, and money market 42. Bank card branch 26 includes credit cards 43, charge cards 44, and debit cards 45. Insurance branch 28 has financial products for auto insurance 46 and home insurance 48.

Each financial product 12 in portfolio 20 has a unique set of attributes and requires multiple variables or parameters to describe its behavior. In order to maintain profitability, bank 10 must evaluate key performance indicators (KPI) and optimize pricing variables under business rules selected for each product in its portfolio in order to meet goals set by the management team of the bank. For example, the goal may be to maximize balance of deposits. The money deposits are essential to maintaining sufficient cash reserves to extend loans and earn interest on those loans in order to generate revenue for bank 10. A number of variables affect deposits, including interest rate, service fees, and linkages to other banking services. For example, a certain minimum balance on deposits may entitle customer 14 to other free services. For many financial services institutions, the growth of loans has outstripped growth of deposits. As interest rates continue to fluctuate and the yield curve flattens, financial services institutions have experienced margin pressure and thus discovered the importance of effective core deposit pricing in terms of optimizing interest rates and other product attributes or variables to achieve strategic profitability growth goals. To increase deposits, bank 10 may increase the interest rate paid for the deposits. However, the higher interest rate paid on deposits tends to lower profitability as part of the cost of doing business.

Alternatively, bank 10 may want to optimize interest rates for money deposits. By paying the optimal interest which maximizes total deposits at the least cost, bank 10 is able to increase revenue by having more money to lend and increase profitability as the difference between the amount earned from the loan and the amount paid for the deposit. Again, a number of variables affect the behavior of customers in response to interest rates for deposits. These variables or parameters must be considered collectively in centralized modeling and optimization tool 18 to achieve the desired goal of increasing revenue and profitability.

In another example, bank 10 may want to increase credit card transactions. The greater the number of credit card transactions, the higher the potential revenue from interest on the unpaid balance on the card. Bank 10 can reduce the interest rate, offer rewards to customers for total value of the transactions, utilize affinity programs, reduce balance transfer fees, and increase the credit limit. Again, multiple variables or parameters control the customer's behavior in using bank 10 for credit card transactions.

Figure 3:
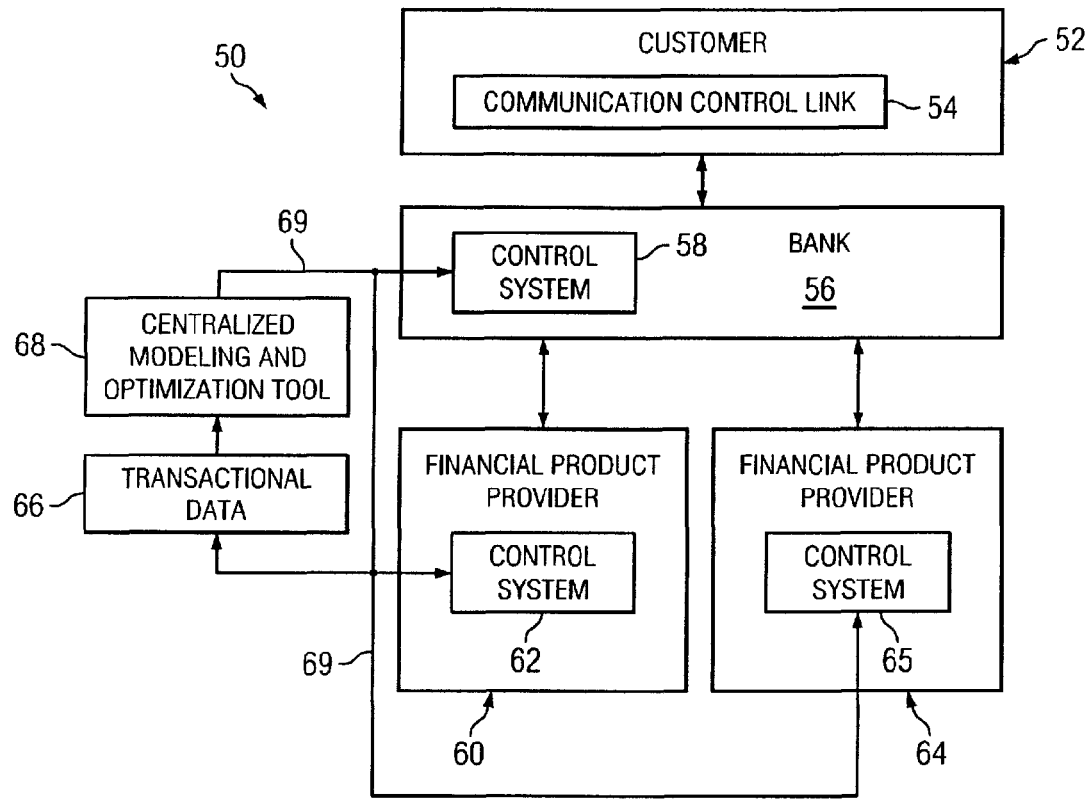
FIG. 3 is a block diagram of a financial commerce system controlled by members utilizing a centralized modeling and optimization tool to evaluate the portfolio of financial products.

The availability, selection, utilization, and management of financial products portfolio 20 are the subject and foundation of a financial commerce system. FIG. 3 illustrates a financial commerce system 50 involving the movement and utilization of financial products between members of the economic system. Customer 52 has a need for financial products to operate in the economic system. Customer 52 can be an individual, cooperative, business, government agency, nonprofit service organization, or other legal entity operating within the economic system. Customer 52 has use for a checking account, savings account, credit card, home loan, commercial loan, insurance, investment services, just to name a few. Customer 52 selects one or more financial products to conduct its daily operations within the economic system. Customer 52 utilizes communication control link 54 to interact with other members of financial commerce system 50, such as bank 56. Communication control link 54 can be a computer system, telephone, or in-person access to bank 56. Bank 56 offers financial products portfolio 20 to meet the needs of customer 52. Bank 56 uses control system 58 to receive requests, distribute financial products, regulate terms and conditions, control operations, and otherwise manage and oversee the portfolio of financial products.

Bank 56 does not directly originate all financial products that it offers. Bank 56 has a relationship with financial product provider 60 to make certain financial products available to customer 52 indirectly through the bank. For example, financial product provider 60 may specialize in bank card services which are provided to customer 52 through bank 56. Financial product provider 60 uses control system 62 to receive requests, distribute financial products, regulate terms and conditions, control operations, and otherwise manage and oversee the financial products which are provided to customer 52 via bank 56. Bank 56 also has a relationship with financial product provider 64 to make certain financial products available to customer 52 indirectly through the bank. For example, financial product provider 64 may specialize in brokerage or investment services which are provided to customer 52 through bank 56. Financial product provider 64 uses control system 65 to receive requests, distribute financial products, regulate terms and conditions, control operations, and otherwise manage and oversee the financial products which are provided to customer 52 via bank 56.

Bank 56 and financial product providers 60 and 64 utilize centralized modeling and optimization tool 68 (equivalent to modeling and optimization tool 18), via respective control systems 58, 62, and 65, to control and optimize financial products portfolio 20 which is made available to customer 52, and otherwise execute respective business plan 16 within financial commerce system 50. Bank 56 and financial product providers 60 and 64 provide historical transactional data 66 to centralized modeling and optimization tool 68 by electronic communication link 69, which in turn generates forecasts to predict the pricing and demand for financial products by each member and control its operations. In one embodiment, each member provides its own historical transactional data 66 to centralized modeling and optimization tool 68 to generate a forecast of demand specific to its business plan 16. Alternatively, all members can provide historical transactional data 66 to centralized modeling and optimization tool 68 to generate composite forecasts relevant to the overall flow of financial products. For example, bank 56 may consider a proposed price, interest rate, promotion, incentive, or other variable for one or more of the financial products in its portfolio. Centralized modeling and optimization tool 68 generates the forecast of demand based on the proposed price, interest rate, promotion, incentive, or other variable for one or more of the financial products. The forecast is communicated to control system 58 by electronic communication link 69, which in turn controls the operations and portfolio management of bank 56 to make the financial product available to customer 52 in accordance with the forecast. Likewise, financial product provider 60 or 64 may consider a proposed price, interest rate, promotion, incentive, or other variable for one or more of the financial products in its portfolio. Centralized modeling and optimization tool 68 generates the forecast of demand based on the proposed price, interest rate, promotion, incentive, or other variable for one or more of the financial products. The forecast is communicated to control system 62 or control system 65 by electronic communication link 69, which in turn controls the operations and portfolio management of financial product provider 60 or 62 to make the financial product available to customer 52 in accordance with the forecast.

Figure 4:
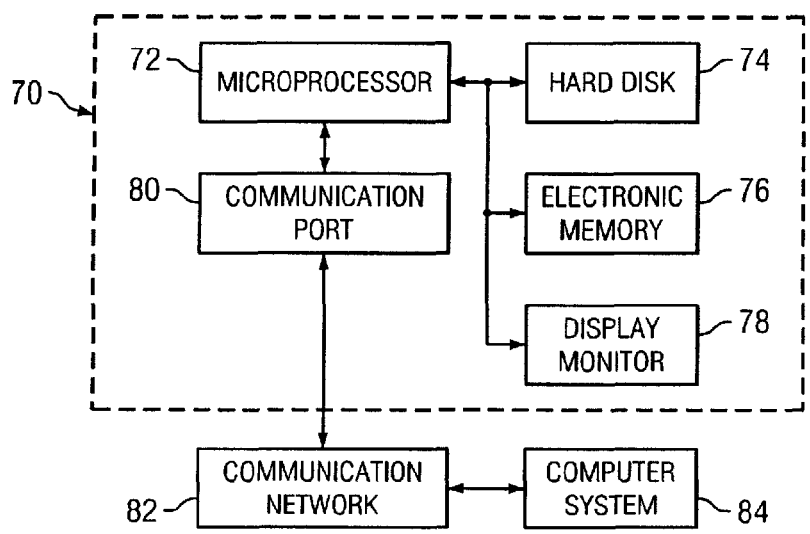
FIG. 4 is a computer system for executing the centralized modeling and optimization tool to evaluate the portfolio of financial products and control the financial commerce system.

In financial commerce system 50, a network of computer systems are used to enable communications between the members to control the financial commerce system. FIG. 4 illustrates a simplified computer system 70 for executing software programs used by the members of financial commerce system 50 and centralized modeling and optimization tool 68 to execute a financial products portfolio modeling and optimization process, as well as exercising control over the financial commerce system. Computer system 70 is a general-purpose computer including a central processing unit or microprocessor 72, mass storage device or hard disk 74, electronic memory 76, display terminal 78, and communication port 80. Communication port 80 represents a modem, high-speed Ethernet link, wireless, or other electronic connection to transmit and receive input/output (I/O) data with respect to other computer systems.

Computer 70 is shown connected to communication network 82 by way of communication port 80. Communication network 82 can be a local and secure communication network, such as an Ethernet network, global secure network, or open architecture such as the Internet. Computer system 84 can be configured as shown for computer 70 or a dedicated and secure data terminal. Computer system 84 transmits and receives information and data over communication network 82.

When used as a standalone unit, computer 70 can be located in any convenient location. When used as part of a computer network, computer system 84 can be physically located in any location with access to a modem or communication link to network 82. For example, computer 70 can be located in the main office of bank 56, and computer system 84 can be located with financial product provider 60 or 64. Alternatively, the computers can be mobile and accompany the users to any convenient location, e.g., remote offices, customer locations, hotel rooms, residences, vehicles, public places, or other locales with electronic access to communication network 82.

Each of the computers runs application software and computer programs which can be used to display user-interface screens, execute the functionality, and provide the features of centralized modeling and optimization tool 68 for the financial products portfolio modeling and optimization process. In one embodiment, the screens and functionality come from the application software, i.e., the system runs directly on one of the computer systems. Alternatively, the screens and functionality can be provided remotely from one or more websites on the Internet. The websites are generally restricted-access and require passwords or other authorization for accessibility. Communications through such websites may be encrypted using secure encryption algorithms. Alternatively, the screens and functionality are accessible only on the secure private network, such as virtual private network (VPN), with proper authorization.

The software is originally provided on computer-readable media, such as compact disks (CDs), external drives, or other mass storage medium. Alternatively, the software is downloaded from electronic links, such as the host or vendor website. The software is installed onto the computer system hard drive 74 and/or electronic memory 76, and is accessed and controlled by the computer's operating system. Software updates are also electronically available on mass storage media or downloadable from the host or vendor website. The software, as provided on the computer-readable media or downloaded from electronic links, represents a computer program product comprising computer readable program code embodied in a computer usable medium. The software contains one or more programming modules, subroutines, computer links, and compilations of executable code, which perform the functions of centralized modeling and optimization tool 68 to execute the modeling and optimization process for the financial products portfolio. The user interacts with the software via keyboard, mouse, voice recognition, and other user-interface devices connected to the computer system. In the case of Internet-based websites, the interface screens are implemented as one or more webpages for receiving, viewing, and transmitting information related to the centralized modeling and optimization tool.

The software stores information and data related to modeling and optimization tool 68 in a database or file structure located on any one of, or combination of, hard drives 74 of the computer systems 70 and 84. More generally, the information can be stored on any mass storage device accessible to computer systems 70 and 84. The mass storage device may be part of a distributed computer system.

In one specific example, bank 56 generates a forecast using centralized modeling and optimization tool 68 based on historical transactional data 66, to predict demand associated with a proposed changes to pricing of one or more financial products, e.g., a lower interest rate for credit cards and lower fees for investment brokerage services. Bank 56 receives and evaluates the forecast. If bank 56 makes the business decision based on the forecast to proceed with the credit card interest rate reduction and investment brokerage fees reduction, control system 58 communicates with control systems 62 and 65 to coordinate offering and distribution of the credit cards and brokerage services to meet the projected demand by customer 52 in view of the interest rate and fee decrease. Assuming financial product providers 60 and 64 agree, each modifies its respective business plan to meet the increase in demand from customer 52. Based on the forecast from modeling and optimization tool 68, bank 56 and financial product providers 60 and 64 adjust their respective operations in anticipation of the higher demand. Centralized modeling and optimization tool 68 is thus used in the control of financial commerce system 50.

Centralized modeling and optimization tool 68 is universal and configurable to optimize each and every financial product in portfolio 20. Bank 56 no longer needs to maintain several specialized or dedicated modeling tools for its portfolio of financial products. Modeling and optimization tool 68 is centralized and configurable to optimize the performance of each financial product in portfolio 20 by defining objective functions that represent financial KPIs and depend on the same variables as the underlying econometric model. Modeling and optimization tool 68 estimates pricing sensitivities of the consumer's demand for products, and uses the economic model in predicting future demand and the optimization of multiple variables in order to maximize and tradeoff different business objectives and KPIs of different financial products. Modeling and optimization tool 68 provides the user with a way to specify financial KPIs, define objective functions, model functional forms and parameters, optimize variables, select business rules, and determine ranges of strategic variables required for planning purposes according to each financial product in portfolio 20 to be evaluated.

The optimization process of portfolio 20 can be performed through variables, or subset thereof, and assessing the impact on values of optimizations. The optimization produces a set of optimized scenarios, each representing a unique strategy or direction of the portfolio performance improvement conforming to the business rules. Modeling and optimization tool 68 allows user to perform a variety of business driven functions and activities such as re-optimization with new modeling parameters, re-optimization within overrides of optimized variables, zooming in and out on the ranges of strategic scenarios defining potential portfolio performance improvements. Modeling and optimization tool 68 also operates within and supports existing workflow functions such as planning, reporting, reviewing, and approving processes.

For the present discussion, a product type is defined as a line of business for bank 56, and a financial instrument is called a pricing segment, such as a loan or CD, characterized or identified by a unique set of attributes. Attributes are the criteria that could impact the rate of the pricing segment, such as the credit score of the customer or term of the instrument. For each attribute, pricing segments should have applicable attribute values or applicable value ranges. For example, a pricing segment could be provided for credit score between 700 and 720, term of one year, combined loan to value (CLTV) between 65 and 80. Thus, a pricing segment is presented of identified as a combination or a set of attribute values. In addition to the attributes, there can be multiple optimization variables that may be associated with a given pricing segment. The pricing segment with credit score 700 to 720, term of 1 year, CLTV between 65 and 80 may have current variables with values of: an interest rate of 3.25%, introductory rate for the first 12 months of 2.5%, and annual fee of $500. Economic modeling and price optimization involves multiple variables to realistically consider the impact on bank-wide KPIs.

Figure 5:
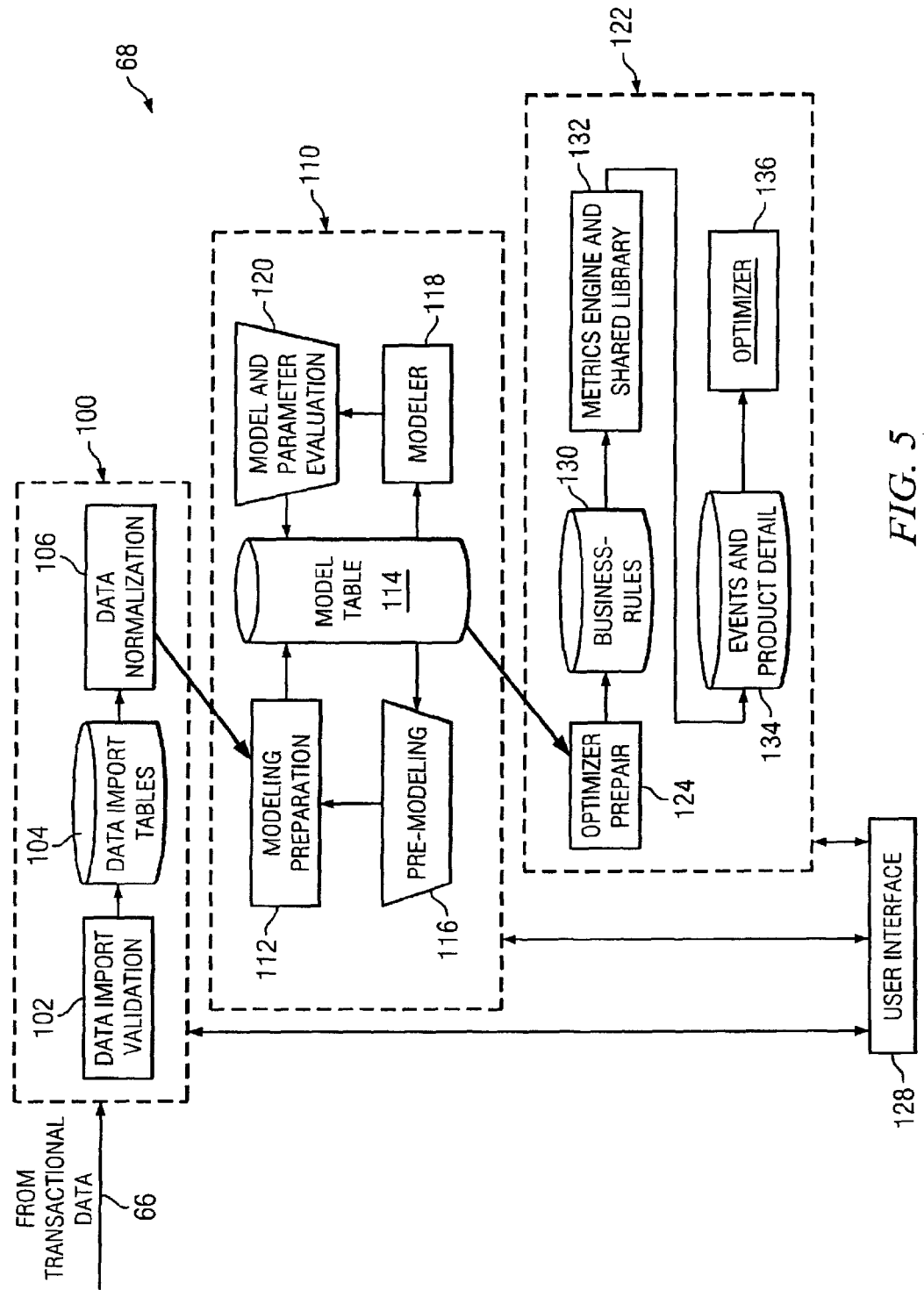
FIG. 5 illustrates the operational phases of the centralized modeling and optimization tool.

The process of economic modeling and optimization in centralized tool 68 can be separated into a plurality of phases, as shown in FIG. 5. Modeling and optimization tool 68 is configured and executed for one of the financial products in portfolio 20 to be evaluated, as described below. In data load and preparation phase 100, customer and other external data, such as competitor information, and macroeconomic indicators, are loaded into data import validation block 102. Historical sales data is crucial to understanding demand trends for financial product to be evaluated. The data is organized and stored into tables in block 104, and then normalized in block 106.

In modeling phase 110, the normalized data is prepared for modeling in block 112, using appropriate aggregation techniques and modeling hierarchies to handle different scenarios, such as seasonality and cannibalization. After modeling preparation, the data is organized and stored in model table 114. In addition to preparation of transaction data for modeling, initial Bayesian prior information, such as pricing sensitivity estimates, are loaded into model table 114. Block 116 performs pre-modeling to aggregate data, model product, and to organize data into time series during the first cycle or after significant change to the data.

The data is read from model table 114 and processed through the mathematical expression representing either the expected or current behavior of the financial product under evaluation in modeler block 118. The mathematical expression is formulated or derived from principles of probability and statistics, often by analyzing historical transactional data and corresponding known outcomes, to achieve a best fit of the expected behavior of the system to other sets of data, both in terms of forecasting and fitting. Modeler block 118 can use a variety of models, such as account originations, renewals, and utilization models. The model estimates the pricing sensitivities of consumer's demand to the various possible regressors, such as multiple variables of the financial products (rates, rewards, fees), competitor products, and macroeconomic indicators. Modeler block 118 also provides information about time dependent parameters, such as seasonal changes, and cannibalization effects among the financial product. Block 120 evaluates and solves the model parameters and stores the parameters in model table 114. The model parameters define a particular model for the financial product being evaluated which predicts with high degree of certainty how the financial product will behave with different sets of data and assumptions.

In optimization phase 122, the model parameters are read from model table 114 into optimizer preparation block 124. In an optimization event creation process, different what-if scenarios that bank 56 can perform are considered in order to plan future product offerings that maximize the relevant KPIs. The product managers of bank 56 consider a variety of constraints, such as constraints that are placed on the event to create optimized scenarios that produce incremental changes away from the current values. The different scenarios describe the development of list prices that support business goals. The list prices are the set of variables that need to be optimized in order to maximize and sometimes tradeoff between several KPIs for bank 56. By using the economic model defined in modeling phase 110, along with a detailed description of variables, KPIs, and selected business rules or constraints for bank 56, multiple possible future scenarios can be modeled and optimized. The product manager can plan a sequence of incremental changes towards maximized KPI without drastic changes.

The optimization event considers a particular subset of pricing segments in a given time period and predicts the current and optimized KPIs of the subset using the economic modeling and price optimization process. The economic model that uses the pricing sensitivities of consumer demand to predict future demand in line with the long-term and short-term goals of bank 56. The optimization event creation process takes the financial product manager through the different steps involved in describing the requirements of bank 56, and in mapping out an overall strategy that considers multiple, sometimes conflicting goals of the bank, and maximizes the benefit to the bank while considering the different tradeoffs. One example of a what-if scenario for a credit-card issuer may involve multiple variables (e.g., annual rate offered, reward percentage points per transaction, and the annual fee charged on the account), different goals of bank 56 (e.g., increase volume, number of sales, increase net profit made, decrease the loss due to expected probability of default, or increase the risk of adjusted return on assets), and additional business constraints while avoiding drastic changes in product pricing, maintaining customer segmentation effects on variables, and meeting certain financial hurdles.

To create a what-if scenario, the optimization event creation process first selects a product or line of business to be analyzed. Each optimization event is described using an appropriate name, provided with an effective date based on product type, modeling version, market group selection to restrict decisions to a subset of the markets, optimization variable selection, movement rules, associated segment rules, and associated variable rules. Additional details such as KPI selection for goal management axes, cell level rules, portfolio level rules (each cell representing unique portfolio segment and variable), rules priorities, and relaxation mechanisms are provided for the product level in the backend with adequate mathematical definition provided for the KPIs to reduce calculation time for different optimization variable values.

Figure 6:
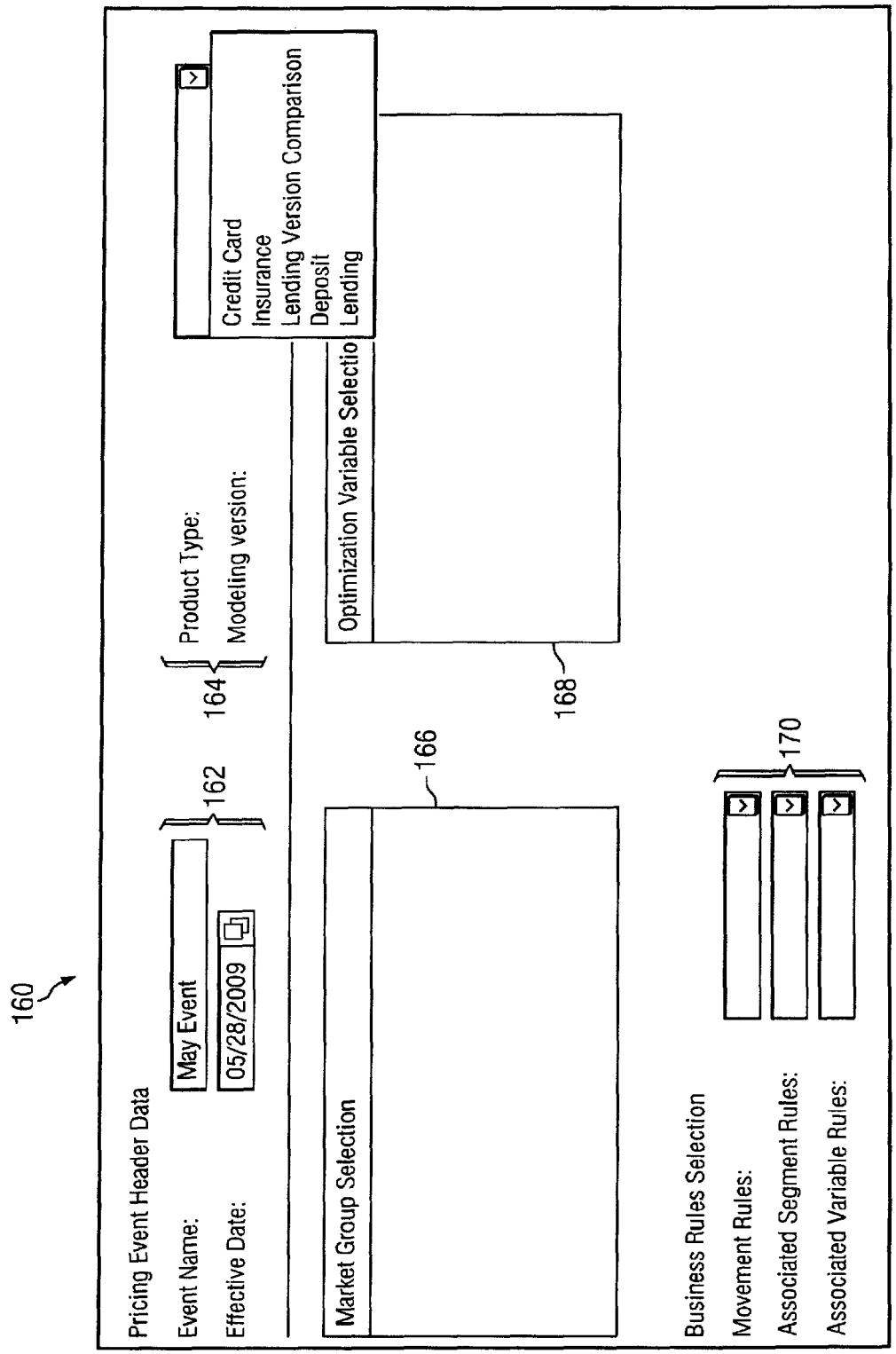
FIG. 6 is a user interface screen for creating a pricing event.

FIGS. 6-12 describe a series of user interface screens or windows for defining financial product specific data, e.g., for a credit card, for configuring centralized modeling and optimization tool 68. FIG. 6 illustrates pricing event creation window 160 as part of user interface 128 into centralized modeling and optimization tool 68. An event name and effective date are entered in block 162. A product type (credit card, insurance, lending, deposit) and modeling version are selected in block 164. A market group selection is made in block 166. Optimization variables selection is defined in block 168. Business rules are selected in block 170 from business rules table 130 in FIG. 5 according to the financial product under evaluation. Each product defines a unique area in financial services, such as deposits, lending, or credit cards, with different product offerings. For example, an indirect lending product offering is dependent on attributes such as term of the loan, balance tier of the loan, credit score of the customer, and value of the collateral. On the other hand, a credit card offering may be dependent on the credit limit, credit score of the customer, marketing channel used for acquisition of the customer, and customer type. In addition, the macroeconomic indicators and competitors may be different based on the financial product. For example, a treasury bill is a macroeconomic indicator for deposits, and home price index (HPI) is an indicator for home equity loans.

A modeling version is defined as the set of data that creates a unique combination of economic model results, with macroeconomic and profit data. Multiple modeling versions can be created using different data sets. A model with one set of Bayesian priors for a set of product attributes and variables can be compared with another model with different Bayesian priors. In a lending product, one modeling version could describe a scenario of the price sensitivity of consumer demand with respect to the credit score of the consumer to be the same for good scores, e.g., 680-720, and excellent scores, e.g., 720-760. Another modeling version can be created where the consumers with excellent scores are more price-sensitive when compared to the consumers with good scores. Another example may be changing macroeconomic or profit data in each time period. Events can be created with two different modeling versions, e.g., months of April and May, and then compared.

Figure 7:
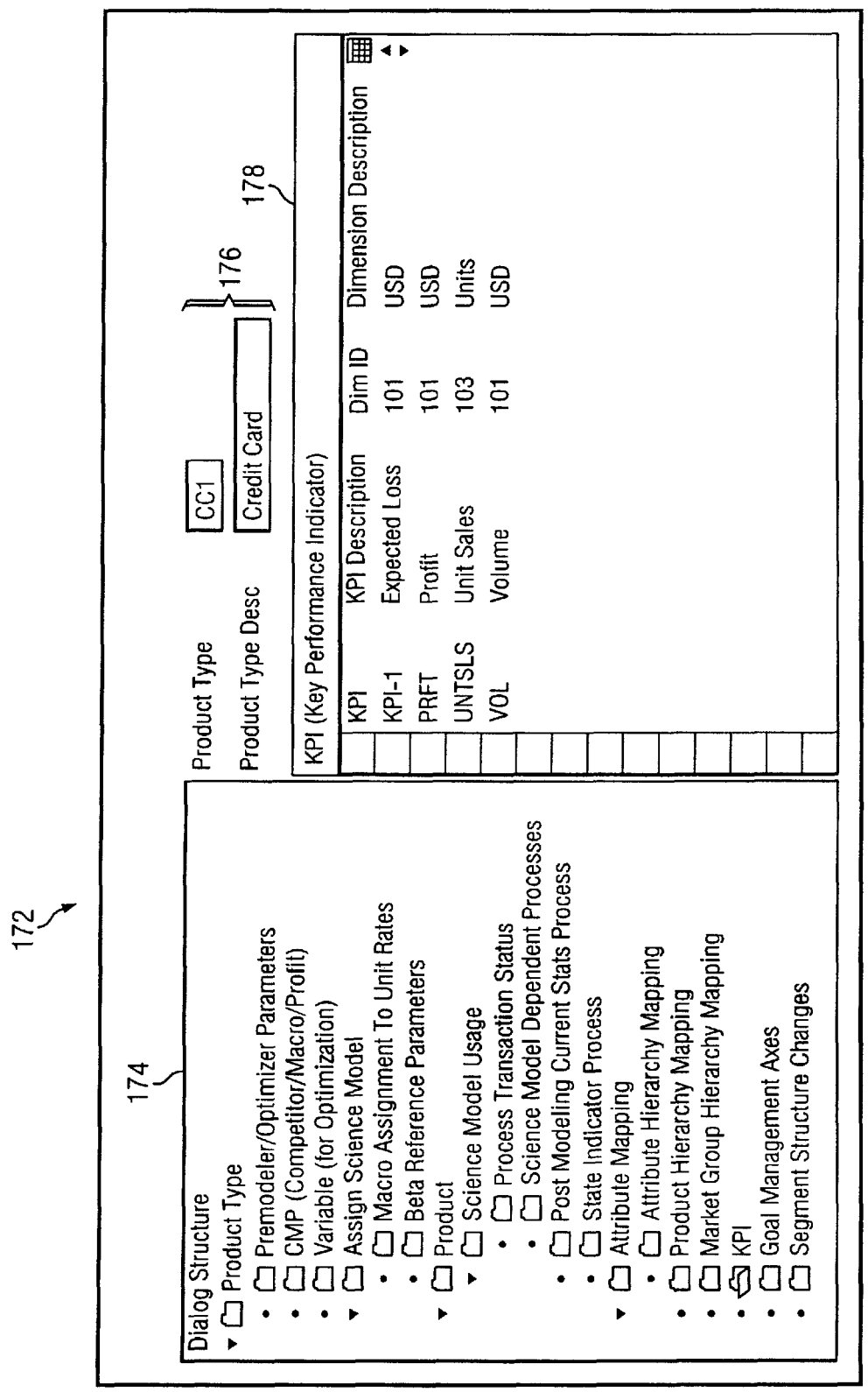
FIG. 7 is a user interface screen for definition of KPIs for each financial product.

FIG. 7 illustrates a KPI definition window 172 for defining KPIs for each financial product type. A hierarchical dialog file structure is shown in block 174 for selecting financial product type. The selected financial product type and description are displayed in block 176. The corresponding KPI for the selected financial product in defined in block 178. Multiple KPIs can be defined for each product type, such as net income after taxes, risk adjusted return on capital, net interest spread, along with the default KPIs that are used for all product types: profit, volume, and unit sales. For example, credit cards need an additional expected loss KPI that calculates the loss for bank 56 due to the probability of default associated with customers with different credit scores.

Figure 8:
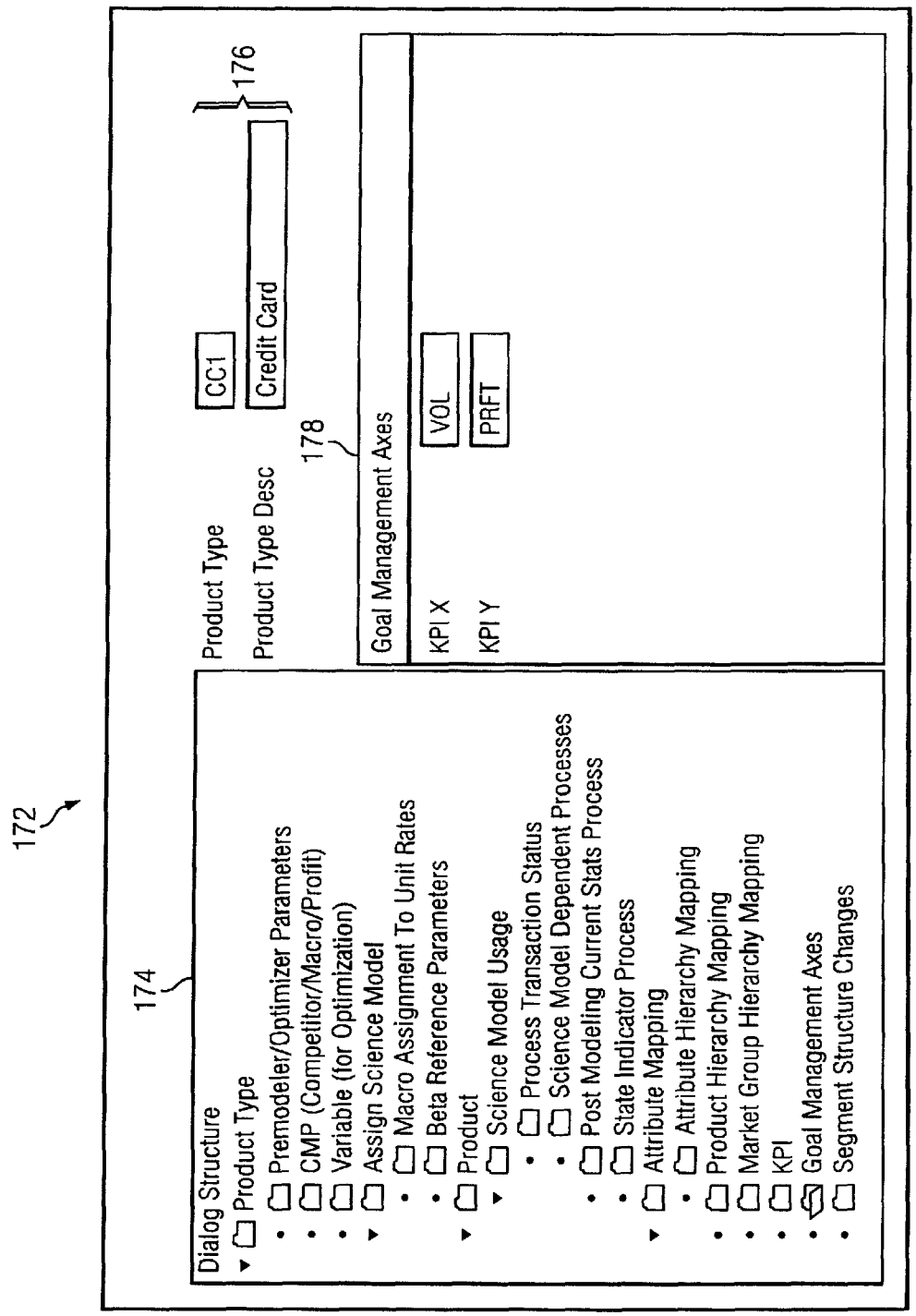
FIG. 8 is a user interface screen for defining KPIs along X and Y axes of a goal management curve.

FIG. 8 illustrates a KPI definition window 172 involving selection of KPIs for the X and Y axes of the goal management curve. Goal management may involve two, possibly conflicting business goals or KPIs of bank 56 that can be combined to create an effective objective for each event. The goal management axes describe the two business goals that have been selected, e.g., origination volume and net present value (NPV). The effective objective of optimization phase 122 uses both KPIs along with an importance or strategy factor ($\lambda$) that performs the tradeoff between the two competing KPIs. For example, the default selection of profit as Y axis, and volume as X axis for the goal management curve would result in an effective objective function of profit+ $\lambda$*volume. Multiple events can be created with different KPI selections of X and Y axes and the product manager can map out an overall strategy that considers multiple conflicting goals of bank 56, and maximizes the benefit to the bank while considering the different tradeoffs.

The optimization variables can be selected to find optimized KPIs. The variables could vary based on the product type. In addition, within a product type, the financial product manager could decide to select different subsets of the optimization variables for each event and create multiple what-if scenarios. The product manager checks the optimized profit and volume when all variables, such as rate, reward and fee, are varied. The product manager also creates a second event where only the rate and fee are varied, keeping the reward percentage points constant at the current values. Comparison of the two events provides an understanding of the importance of the reward variable in affecting the total sales and other KPIs.

FIG. 9 illustrates window 190 for creation and modification of business rules applicable for a particular financial product or category of financial products in centralized modeling and optimization tool 68. Product type is selected in block 192. Rule type is selected in block 194. The business rule is specified in block 196, such as cell level rules, movement rules, associated segment rules, and associated variable rules. The business rules are stored in table 130 and provide the rules or constraints that bank 56 must follow in setting pricing for the financial products. For example, based on home equity loans and lines of credit, business rules table 130 may include (a) maximum rate change per cell not to exceed predefined limit per pricing cycle, e.g., 30 bps or basis points; (b) maximum rate should not exceed predefined values, e.g., 18% annual percentage rate (APR); (c) no price differentiation by channel; (d) no differentiation between second and third lien pricing; (e) fixed rate products have a consistent gap between FICO and term tiers within a dollar tier; (f) no rate differentiation between HEL and fully amortizing fixed rate loan option (FRLO) prices for similar parameters; (g) each product cell will have positive NPV performance; (h) each product cell will have risk adjusted return on capital (RAROC) not lower than predefined level, e.g., 30%; and (i) portfolio of home equity line of credit (HELOC) second lien will have minimum return on tangible equity (ROTE) of predefined level, as well as minimum RAROC of predefined value. A variety of business rules can be handled during optimization. Cell level rules require each optimization variable of a pricing segment to have rules that set bounds on the possible values it can take. In one example, the interest rate provided for deposits account cannot be below zero.

FIG. 10 illustrates window 200 for creation and modification of movement rules. Product type and movement rule name is selected in block 202. The movement rule is defined in block 204. In order to minimize drastic changes away from the current values of the variables, movement rules can be set that define the maximum movement up and down from the current value of each optimization variable. Another consideration for having movement rules that prevent drastic changes is that the mathematical representation for consumer demand created during the economic modeling phase is based on the previous history of demand. Any drastic changes in variables amplify risk associated with the uncertainties around parameters estimates. In block 204, the rate and reward can be constrained for each price segment to be within 50 basis points from current values. The annual fee to be within $50 from the current values of the price segment.

FIG. 11 illustrates window 210 for creation and modification of associated segment rules (ASR). Product type, segment rule name, and rule set variables are selected in block 212. An attribute list for the associated segment rule is defined in block 214. Gap values are selected in block 216. Associated segment rules require that customer segmentation models employed in financial services firms usually lead to the creation of pricing strategies that are based on the type of pricing segments offered to the customer. In the lending scenario, customers with excellent credit scores get a lower interest rate when compared to customers with low credit scores. One strategy selected by the product manager may be that the customer with excellent credit scores should get an interest rate that is at least 50 basis points lower than the customer with low credit score. The associated segment rules capture those business constraints that link any two different pricing segments on the same optimization variable. The product manager can select each optimization variable, and create rules based on the attributes used to define the pricing segments. The interest rate provided to Internet channel customers may be higher than the rate provided to mail channel customers by at least 25 basis points, as shown in block 216. The associated segment rules could have multiple types based on the business requirements. An exact gap rule implies that the difference in optimization variable between any two pricing segments has to be exactly equal to a specified value. A pricing rule implies that the optimization variable of one pricing segment either increase or decrease when compared to another pricing segment. In addition, rules can be created to explicitly ignore or partition some sets of variables to avoid creating conflicting rules.

FIG. 12 illustrates window 220 for creation and modification of associated variable rules (AVR). Product type and variable rule name are selected in block 222. Rule set variables are defined in block 224. Associated variable rules are similar to creating rules between different pricing segments based on one single variable. It is possible to create rules between different optimization variables of the same pricing segment. For example, the product manager for a credit card issuer can decide that the introductory rate or balance transfer rate provided for pricing segments offered to the customer have to be at least 50 basis points lower than the rate provided for the same pricing segment, in order to stimulate an increase in new customers.

Portfolio level rules (PLR) apply to the entire product type, and as such designate the long-term strategies of bank 56. Along with the two, possibly conflicting KPIs selected for optimization for each event, it is possible to set bounds on any other KPI in order to meet the strategic goals of the organization. A product manager can set a lower bound on the risk adjusted return on capital across all pricing segments offered by bank 56, or that the net present value of balances for all pricing segments provided by the bank has to be greater than a specified value.

Returning to FIG. 5, the business rules 130 are made available to metrics engine and shared library 132. The metrics engine is used to calculate all KPIs by calling on appropriate functions in the shared library. The optimizer 136 uses the metrics engine and shared library 132 as required for KPI valuation and KPI derivative calculation for different optimization variable values. The details of the optimization event creation and the output from the optimizer are displayed in the events and product detail table 134. The price optimization develops optimized prices for multiple variables, such as rates, rewards, and fees at the same time for each event. The optimization requires the use of nonlinear programming algorithms with suitable modifications and improvements that take into account the unique problem features required in the financial services industry.

In optimizer 136, the business requirements of the what-if scenario is converted into a mathematical form describing the optimization problems. Multiple optimization techniques can be employed to solve the problems using appropriate modifications and improvements that result in faster optimization. For each optimization event, a number "n" of pricing segments and number "m" of optimization variables defines the number of total variables that need to be optimized. Each variable $v_i^j$ with i in 1 ... n, and j in 1 ... m, represents a single variable that affects the KPIs. The goal management axes represent the two KPIs that are combined in the effective objective function for the optimization—the function is calculated as $KPI_Y + \lambda KPI_X$, where $\lambda$ is a scaling factor that represents the tradeoff that is made between the two KPIs. Each value of $\lambda$ represents a different scenario in the opportunity curve that is built with the results from the optimization. In a simple no bounds optimization model, the set of optimization models that need to be solved include k scenarios is given in equation (1).

For $\lambda \epsilon 1 \ldots k$, solve $k$ problems max $KPI_Y + \lambda * KPI_X$ subject to $v_i^j \epsilon \mathbb{R}$ \hfill (1)

In the lending case, for example, the goal management axes could be profit and volume, and the variable $v_i^1$ is rate and variable $v_i^2$ is fee in the simple effective objective function given in equation (2). The modeler output data includes $q_0$ as base demand, beta as demand sensitivity with respect to the first variable, and gamma as the demand sensitivity with respect to the second variable. In addition, unit profit is calculated as an expression involving the rate, and fee variables and the unit cost of funds (C) for bank 56. The actual KPIs used by bank 56 can be nonlinear mathematical expressions that combine the modeler output data, e.g., a logit or multinomial model, with additional profit data.

$$\pi = PRFT + \lambda * VOL = \sum_i e^{q_0 - \beta_i v_i^1 - \gamma_i v_i^2}(a_i v_i^1 + a_i v_i^2 - C + \lambda) \quad (2)$$

Equation (2) is an example of the nonlinear objective function faced by optimizer 136. A more general objective function need not have a closed form numerical expression, and can involve complicated loops, for example over multiple years as in NPV calculations, or conditional statements.

The business rules defined during optimization event creation are considered in order to place bounds on the optimization models defined above. Each business rule has a different effect on the optimization model. Cell level rules and movement rules create constraints at the pricing segment cell level. Each variable in the model (pricing segment*optimization variable), i.e., $v_i^j$ with i=1 ... n and j=1 ... m, has an upper or lower bound based on these rules. The cell level rules can set a lower bound on all rates in a deposits scenario to be greater than zero, which translates into the constraint: $v_i^1 \geq 0$, $\forall i$.

The movement rules provide both lower and upper bounds on the variables based on current values, and the maximum up and down selected for the rule. If all the rates have a maximum down movement set to d, and a maximum up movement set to u, the rules translate into constraint $c_i^1 + d \leq v_i^1 \leq c_i^1 + u$, where c is the current value of each variable.

Associated segment rules link the same variable across two different pricing segments using gap values and translate into linear constraints. Depending on the rule type selected, the constraints can either be equality constraints of the form of $r_1 = r_2 \pm \alpha$, where $\alpha$ is a gap value; $\pm$ represents the direction of rate change, increasing or decreasing, or inequality constraints of the form of $r_1 < r_2 \pm \alpha$. During creation of the associated segment rules, an intelligent network maps the multitude of rules spanning millions of pricing cells into a minimally defined structure or tree that avoids infeasibilities and reduces the computation time for optimizer 136. In modeling and optimization tool 68, an additional rule generator builds a minimally spanned tree connecting all contributing active pricing segments in a hierarchical network of rules.

Associated variable rules link multiple variables across the same pricing segment using gap values, and translate into linear constraints that are similar to the associated segment rules. One additional feature that is required of associated variable rules is the scale associated with each variable. One business rule requirement may link two variables with different scales. If the introductory rate provided is usually around 5 times lower than the rate provided, the constraint is of the form of $IR \leq (1/5)*r$. Hence, the final constraints can be of the form of $a*r_1 = b*r_2 \pm \alpha$, or $a*r_1 < b*r_2 \pm \alpha$, where a, b are scaling factors for the variables, depending on rule type selected.

Portfolio level rules set bounds on secondary KPIs, other than the ones considered in the main tradeoff objective function, and translate into linear and nonlinear constraints. The addition of nonlinear KPI related constraints handles more than two goals of the business at the same time. For any financial services institution, even though only two main KPIs are considered for any one event, the other goals are not violated.

Considering all the possible types of business rules that can be translated into constraints and added to the optimization models, optimizer 136 is able to optimize a nonlinear objective function, with linear and/or nonlinear constraints, and definite fixed bounds on all variables.

The set of optimization problems that have to be solved, including all bounds and linear and nonlinear constraints are given in equation (3), with v as the vector of variables, $f_X$ and $f_Y$ as the main KPIs considered for tradeoff, $\lambda$ as the scaling factor, l and u as the lower and upper bounds vectors, a and b as the matrices that define linear constraints, and g(v) defining additional secondary KPIs with their bounds.

For $\lambda \in 1 \ldots k$, solve $k$ problems $\max f_Y(v) + \lambda^* f_X(v)$ subject to $l \leq v \leq u$ $a \cdot v \leq b$ $g(v) \leq 0$ \hfill (3)

Various optimizations methods and techniques can be employed to optimize the vector of variables v in order to maximize or minimize the main KPIs considered for tradeoff. The optimization depends on the characteristics of the specific optimization model, for example presence of linear or nonlinear constraints, and optimization technique, such as exact solver methods or heuristics, being implemented. In one embodiment, the user selects several optimization approaches and compares the results obtained by using a variety of methods on the same data set, i.e., KPIs being considered for tradeoff, variables with bounds, and business rules. The general optimization approach includes exact solver methods like nonlinear programming algorithms, (considering all the options of unconstrained, bound-constrained, linearly-constrained, and nonlinear constrained), branch and bound methods, branch and price methods, and any forms of heuristics like Ant algorithms, genetic algorithms, tabu searches, and simulated annealing.

Modeling and optimization tool 68 allows for the incorporation of any user defined optimization algorithms. In addition, separation of data, optimization model, and optimization algorithms are enforced. The separation helps in the abstraction of optimizer 136 from changes in the underlying data models used to store the information itself. A data package handles all the input and output data requirements of optimizer 136. A model package provides basic interfaces that are required to define standard optimization problems, such as linear programming problem, nonlinear programming problem with linear constraints, and nonlinear programming problem with nonlinear constraints. A solver package designs the optimization algorithms required to solve the optimization problem.

For certain kinds of optimization problems, specific optimization approaches can be applied that are more efficient than the general purpose optimization techniques. One class of optimization problems involve a situation where the main KPIs calculated per pricing segment are dependent on only one variable each. In this scenario, each decision variable can be independently optimized, and in some cases with a closed form analytical expression for the optimum values. In case each decision variable can be independently optimized, the specific methods include closed form analytical solution, one dimensional maximization of continuous or discrete decision variables, optimization technique that efficiently handle logit-type economic models, or other user defined optimization algorithms.

In many cases, the main KPIs are dependent on more than one decision variable at the same time. When multiple variables are considered per pricing segment, e.g., multi-variable optimization (MVO), the KPI of each pricing segment is dependent on all the variables. The profit obtained from a single type of credit card can be dependent on the interest rate associated with the card, and reward points provided to the customer, as well as the annual fee on the card. In addition, most realistic scenarios involve the use of business rules that link one pricing segment to another. The rate provided to one customer may need to be higher than the rate provided to another by at least 50 basis points. Another scenario involves the presence of cannibalization between segments. The rate provided to a CD may influence the unit sales of the CD, as well as the sales of any similar money market (MM) accounts.

The optimizer 136 must consider all the implications of connections between the different decision variables and reduce the total time taken to optimize by analyzing and utilizing the locations of separability that is inherent in the optimization problems. In a case separability, as explained in FIG. 13, a single pricing segment can have multiple variables. Multiple pricing segments can cannibalize each other—and those that cannibalize are collected in a set called a demand group. Market group 230 contains demand groups 232, 234, and 236. The economic modeling determines the amount of effect each segment has on others by calculating a cannibalization factor. Demand group 232 contains pricing segment 238 and pricing segment 240; demand group 234 contains pricing segment 242; demand group 236 contains pricing segment 244 and pricing segment 246. Pricing segment 238 has rate 248 and fee 250; pricing segment 240 has rate 252 and fee 254; pricing segment 242 has rate 256 and fee 258; pricing segment 244 has rate 260 and fee 262; pricing segment 246 has rate 264 and fee 266. Business rules can link the variables of a pricing segment by associated variable rules, or link the variable of one pricing segment with another by associated segment rules.

The analysis of separability of an optimization problem is dependent on both the dependence of the KPIs on the decision variables, and the linkage between the variables based on business rules. A typical KPI that is based on the economic model that uses cannibalization is dependent on the demand group in order to capture cannibalization between the different pricing segments. If the KPI is dependent on the demand group, then variables of a single segment must be optimized together to handle AVRs, as well as consider their effects as a whole on the KPIs. Pricing segment 238 and pricing segment 240 must be optimized together to consider cannibalization and the connecting ASRs. Similarly, pricing segment 244 and pricing segment 246 must be optimized together to consider cannibalization. In addition, pricing segment 242 and pricing segment 246 have to be optimized together to handle the connecting business rule.

The single optimization problem that contains all the pricing segments in the market group can be solved as two different optimization problems: one containing pricing segments 238 and 240, and the other containing pricing segments 242, 244, and 246 and their associated variables. The set of optimization models that must be solved, after separability, are given in equation (4).

For $\lambda \in 1 \ldots k$, solve $k$ problems

Solve $s \in 1 \ldots m$ separable problems with individual data $v_s$ $\max f_Y(v_s) + \lambda^* f_X(v_s)$ subject to $l_s \leq v_s \leq u_s$ $a_s \cdot v_s \leq b_s$ $g(v_s) \leq 0$ \hfill (4)

By creating smaller optimization models, the performance of optimizer 136 can be improved significantly. Calculation of the KPIs can now be broken down to a number of smaller problems dependent only on the subset of variables $v_s$, and not on the entire variable v. By reducing an original large optimization problem as defined in equation (3) to a set of smaller optimization problems as defined in equation (4) significant amounts of processing times and resources can be saved.

As discussed above, various optimization methods and techniques can be employed to optimize the vector of variables v in order to maximize or minimize the main KPIs considered for tradeoff. The actual optimization techniques utilized by the optimizer can be selected by the user by setting appropriate configuration parameters. In addition, the optimization algorithms could be configured with appropriate settings so that some parameters affect the performance of optimizer 136, or configure different what-if scenarios for financial services institutions. In starting solution and λ sequencing, one requirement of bank 56 is to minimize drastic changes away from the current values of the variables, avoiding sudden changes to the rate sheet, and also making sure that economic models based on previous history of demand are accurate.

One way to set parameters for optimization could be to use the current solution as the starting point always, and then search nearby. However, as the opportunity curve is built by re-solving the same set of optimization problems multiple times by changing the scaling factor λ, starting at the current solution every time increases the performance time taken by the optimizer. Another alternative is to consider the current solution as the starting point for the first iteration, and then using the optimal solution of each scaling factor as the starting point for subsequent iterations. The computation time taken by optimizer 136 is reduced significantly as subsequent optimal solutions for optimization problems that have similar scaling factors would be close to previously computed values, thereby avoiding a search over large areas multiple times.

Yet another starting solution parameter could be an intelligent λ sequencing algorithm, which involves the intermittent use of the current values of the variables as the starting solution. Instead of changing the λ values sequentially from the minimum value to the maximum value, it is possible to sequence the λ values from the maximum to the minimum, or sequence them from the mid-value of the range towards the minimum or the maximum. The sequence itself that is chosen, and the values of the scaling factor for which the current minimum, mid-point, and maximum values are used as the starting solution, depend on the type of KPIs involved in the optimization.

Depending on one of the optimization parameters that is selected, the optimum solution could be either a local optimum that is optimal only when a region is close to the starting solution, or a global optimum. Some optimization techniques cannot guarantee finding the global optimum unless multiple starting solutions are employed or a thorough brute-force search is employed. One of the selectable optimization configuration parameters involves the requirement of local or global optima.

Different optimization techniques could be selected based on user provided configuration parameters, including nonlinear programming methods, heuristics methods, or user supplied algorithms. Conjugate gradient methods or Quasi-Newton methods can be selected for nonlinear programming requirements of the user. Conjugate gradient methods are usually better at memory management and use lower memory per iteration, but have slower convergence rate. Depending on the size of the optimization problems, the user can choose the optimization technique that is best suited. In case there is no derivative information available at all, a heuristic approach could be selected by the user.

An optimization configuration parameter could specify whether there are exact derivative functions available for any given KPI, or if the algorithm will have to use numerical differentiation techniques to determine the derivative or partial derivatives required during optimization. If the user is able to provide an exact derivative calculation, the optimization is much more computationally efficient. Numerical differentiation can take a significant amount of computation time as the number of decision variables increases. Some additional parameters could be specified in special circumstances where the KPI is either linear with respect to certain decision variables, or if the KPI can be split into a linear component and nonlinear component that is dependent on the unit sales forecasted by the economic model. For example, the total profit for a car loan pricing segment could be split into a unit profit multiplied with the forecasted unit sales of the segment. As the economic model provides an exact mathematical representation of the unit sales, it is possible to calculate the derivative for the unit sales using an exact derivative calculation. If the unit profit for the segment is linear in decision variables, the computation time required for the optimization is significantly lower.

Figure 14:
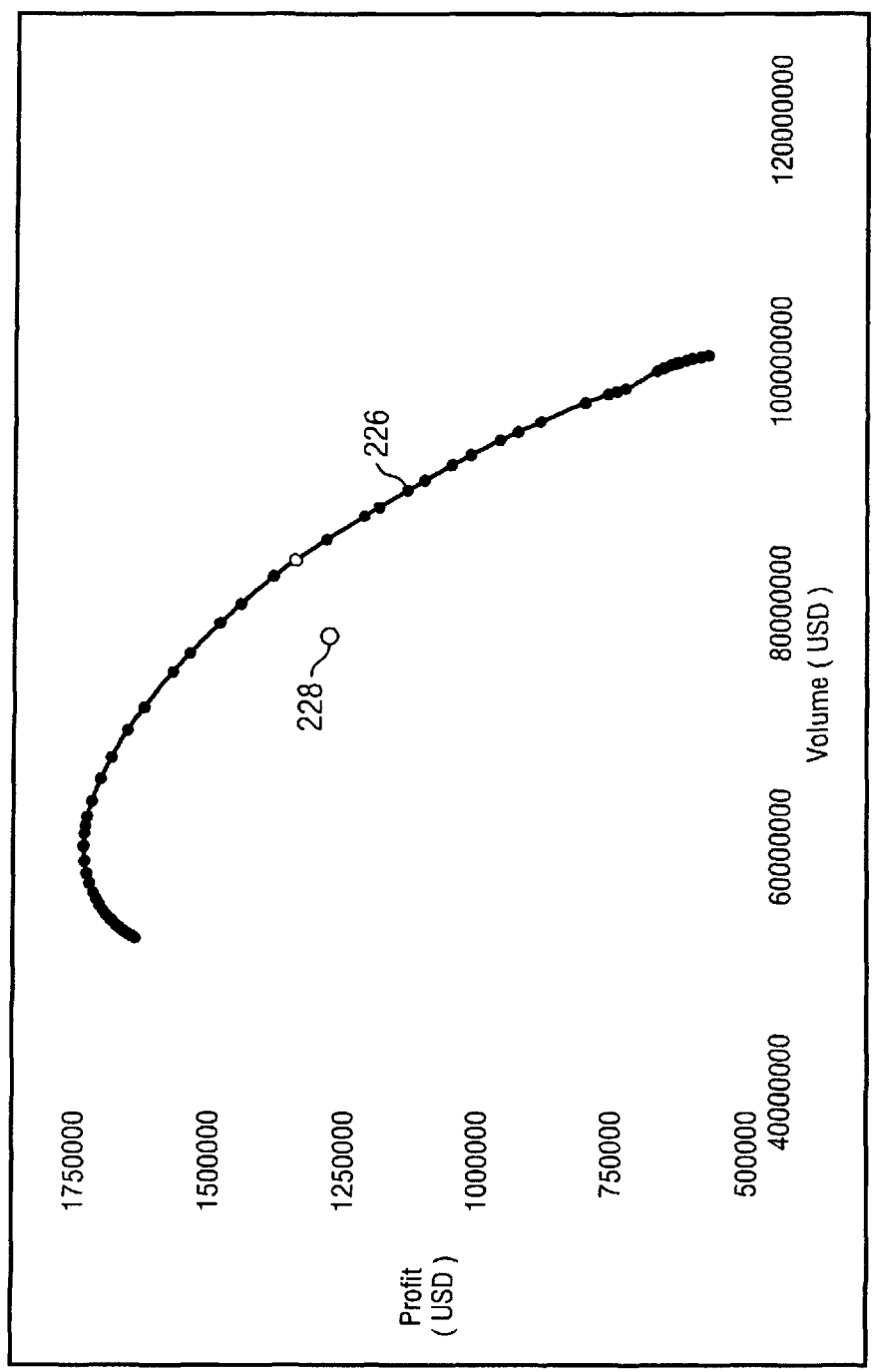
FIG. 14 is a graph of profit versus volume in multiple tradeoff scenarios between KPIs.

Once optimizer 136 solves the separable optimization problems for all the possible scaling factor scenarios, an opportunity curve such as shown in FIG. 14 provides a graphical representation of multiple tradeoff scenarios between the main KPIs, while maintaining all selected business rules. The opportunity curve 226 is an efficient frontier curve, for all the selected pricing segments in an event, which provides the optimum values of the two KPIs in the effective objective. Each point on the opportunity curve represents a different scenario that defines a specific value of tradeoff between the two KPIs. For example, from a business point of view, profit and volume of customer transactions are trade-off characteristics. With increase in profit, the number of customers and volumes may decrease. To get more customers, the business may have to accept less profit. The point 228 represents the profit and volume with current values for decision variables, and curve 226 represents the optimal profit and volume for different scaling factor values.

Figure 15:
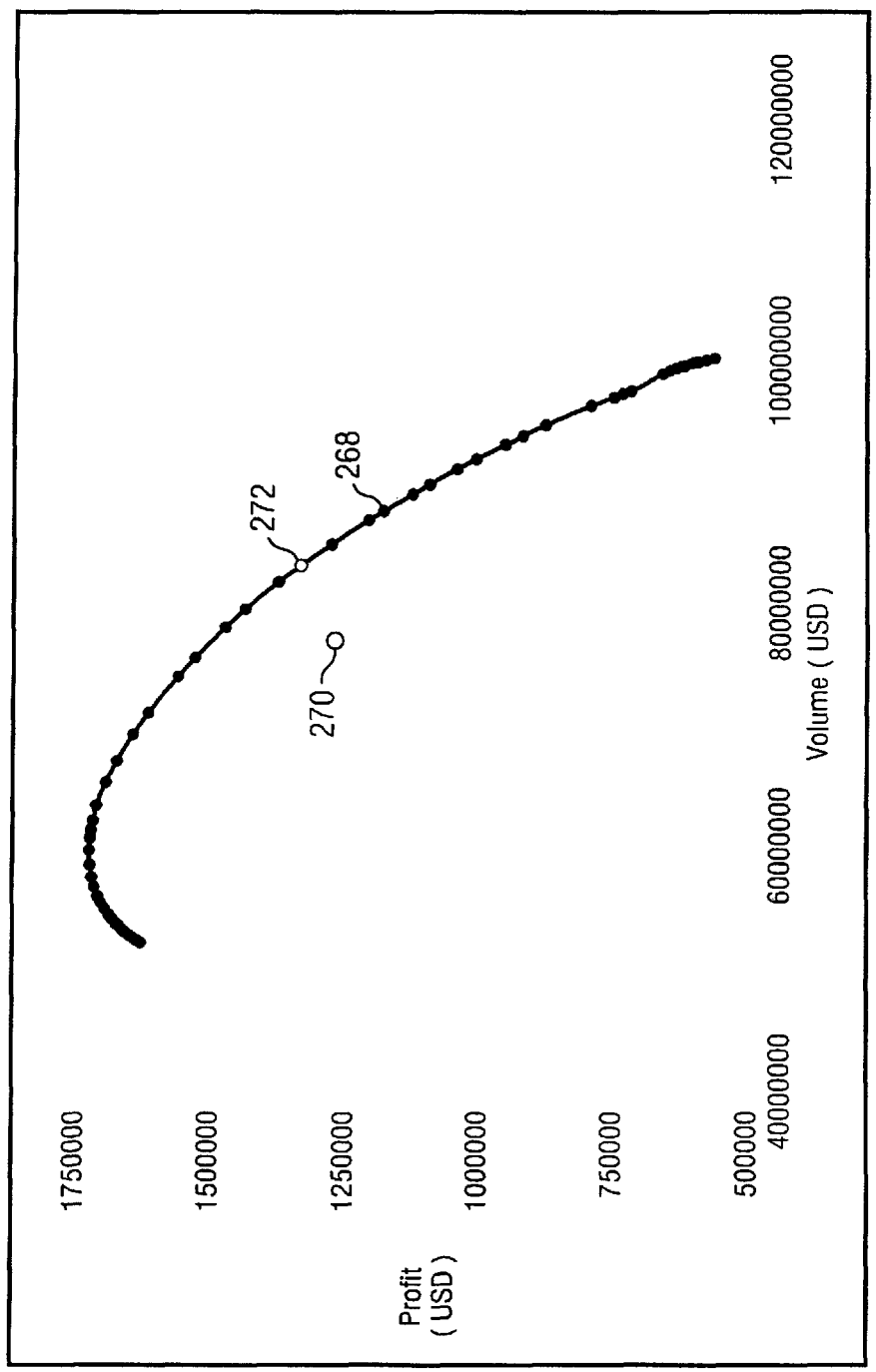
FIG. 15 is a graph of scaling factor scenarios representing different strategic objectives.

FIG. 15 shows opportunity curve 268 of scaling factor scenarios representing different strategic objectives available to the user. The point 270 represents the profit and volume with current values for decision variables, and curve 268 represent the optimal profit and volume for different scaling factor values. If the user plans to increase the total volume of the portfolio without losing any profit, the point on opportunity curve 268 to the right of point 270 can be selected. On the other hand, the point directly above point 270 represents the strategic objective of increasing profit without losing any volume. If for example, point 272 is selected, then the volume increases by around $6M, and the profit increases by around $60K.

Once the point that represents the strategic objective of the user is selected, the user can then build the price file—each point provides a complete rate sheet, which is a listing of all the pricing segments with their current, optimum, user values of the optimization variables. A cell in the rate sheet defines a single optimization variable. The optimal values for the decision variables of the pricing segments in the portfolio are displayed in the price event detail. In FIG. 16, the price event detail rate sheet window 280 shows pricing segment, market group name, product, customer type, credit score, channel, credit limit, optimal rate, optimal reward, and optimal fee for each of the pricing segments selected in the event.

The user can perform additional analysis after the optimization of the KPIs. In some scenarios, the user may not be satisfied by the movement of optimal variable values away from the current value. In window 282 of FIG. 17, modeling and optimization tool 68 allows user override options for the rate sheet. The optimal rate calculated for a particular pricing segment may conflict with additional promotional campaigns being conducted by bank 56. The user can then select the actual promotion campaign value into the user rate column, and calculate the effect on the KPIs. If multiple pricing segments have been fixed by user overrides, the subset of remaining decision variables can be re-optimized.

Figures 13, 18:
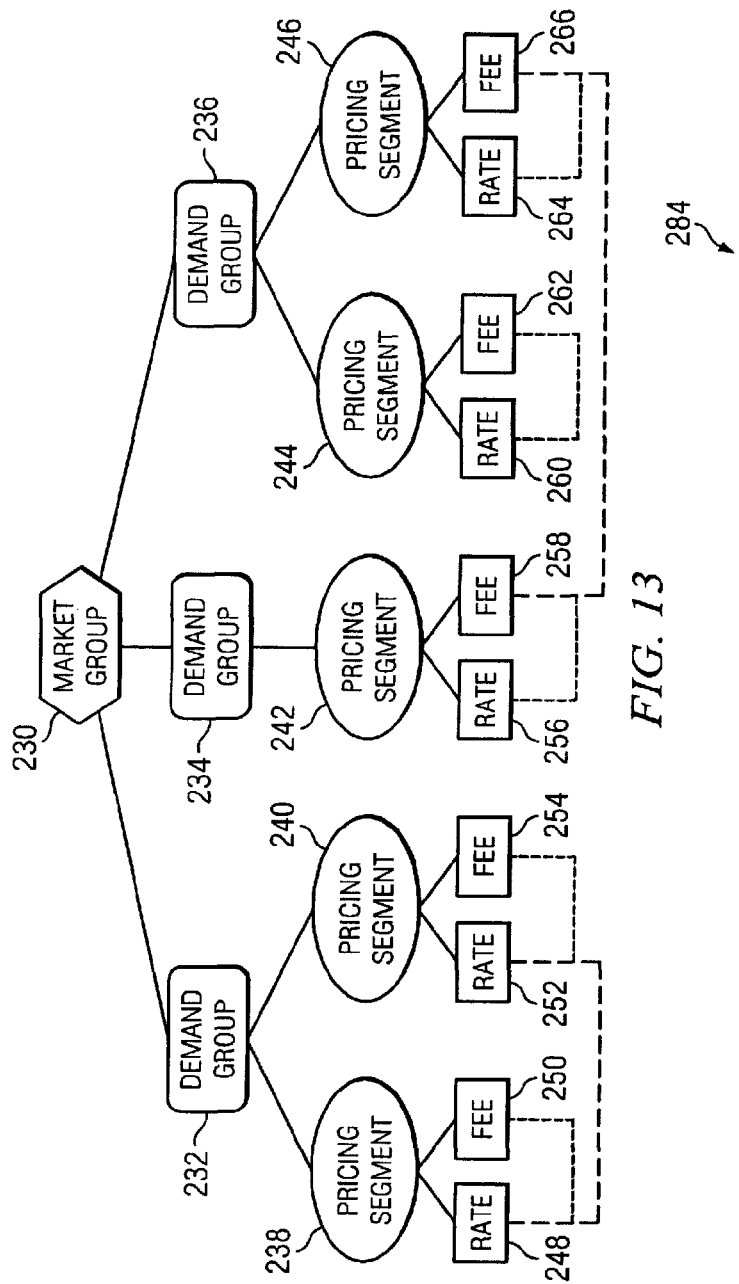
FIG. 13 illustrates relationships between pricing segments for demand groups in a market group.
FIG. 18 is a user interface screen showing event totals for current, optimal, and user KPIs.

FIG. 18 shows the rate sheet window 284 with the differences between the current, optimal, and user KPIs after all user overrides have been completed. The event totals show the difference between the current, optimal and user KPIs as well—and thus provides a high level report about the effect of pricing optimization at the portfolio level.

Figure 19:
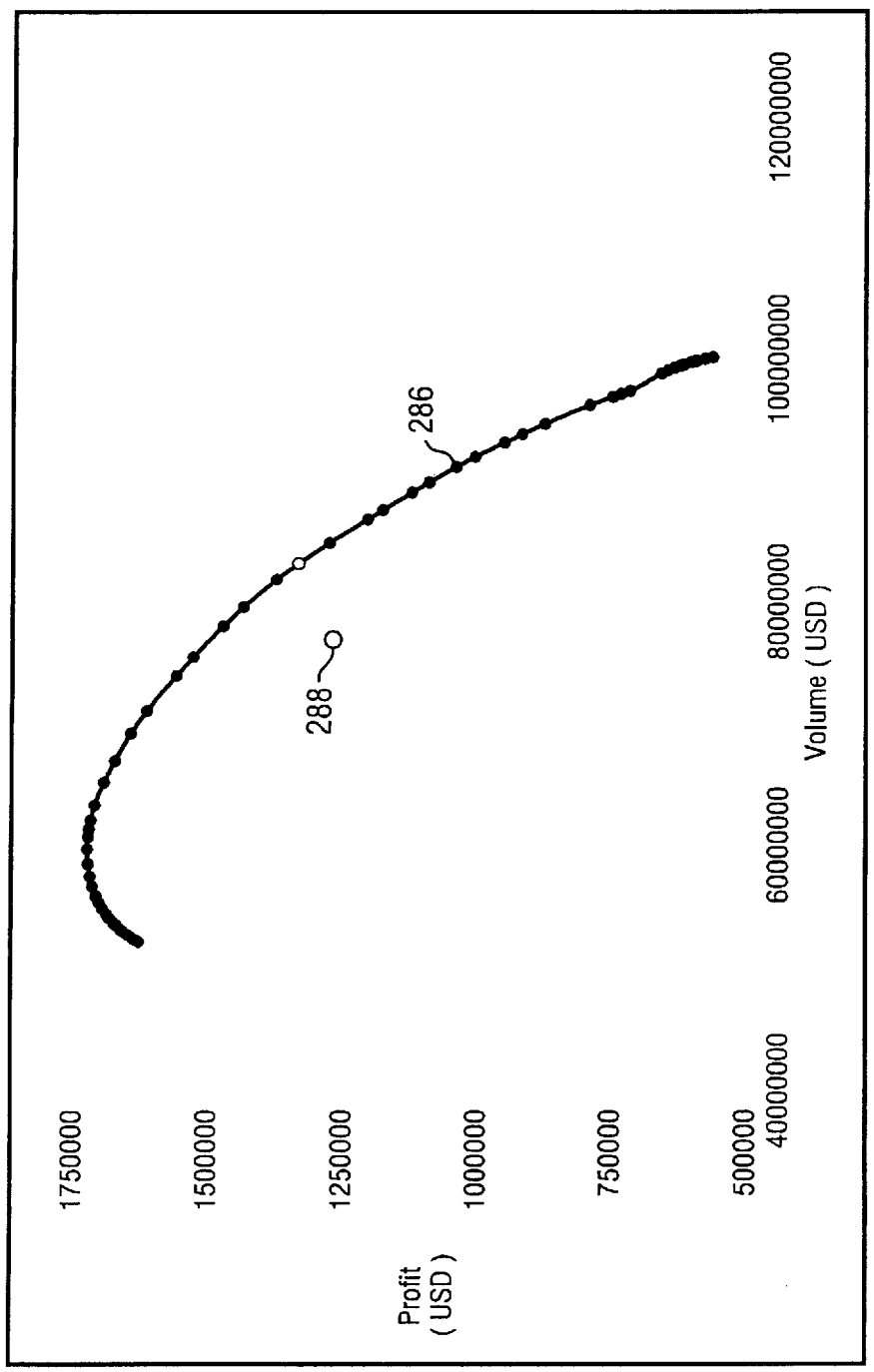
FIG. 19 is a graph showing re-optimized KPIs with different scaling factors.

The scaling factors chosen for the optimization models can be changed by the user. As the scaling factor range represents the different strategic objectives of bank 56, and the tradeoff between the main KPIs that they are willing to consider, the λ minimum and maximum values, as well as the number of tradeoff scenarios that can be created between the λ minimum and maximum values, can be tuned. FIG. 19 shows the effect of λ scaling changes on the re-optimized opportunity curve 286 with respect to current point 288.

Figure 20:
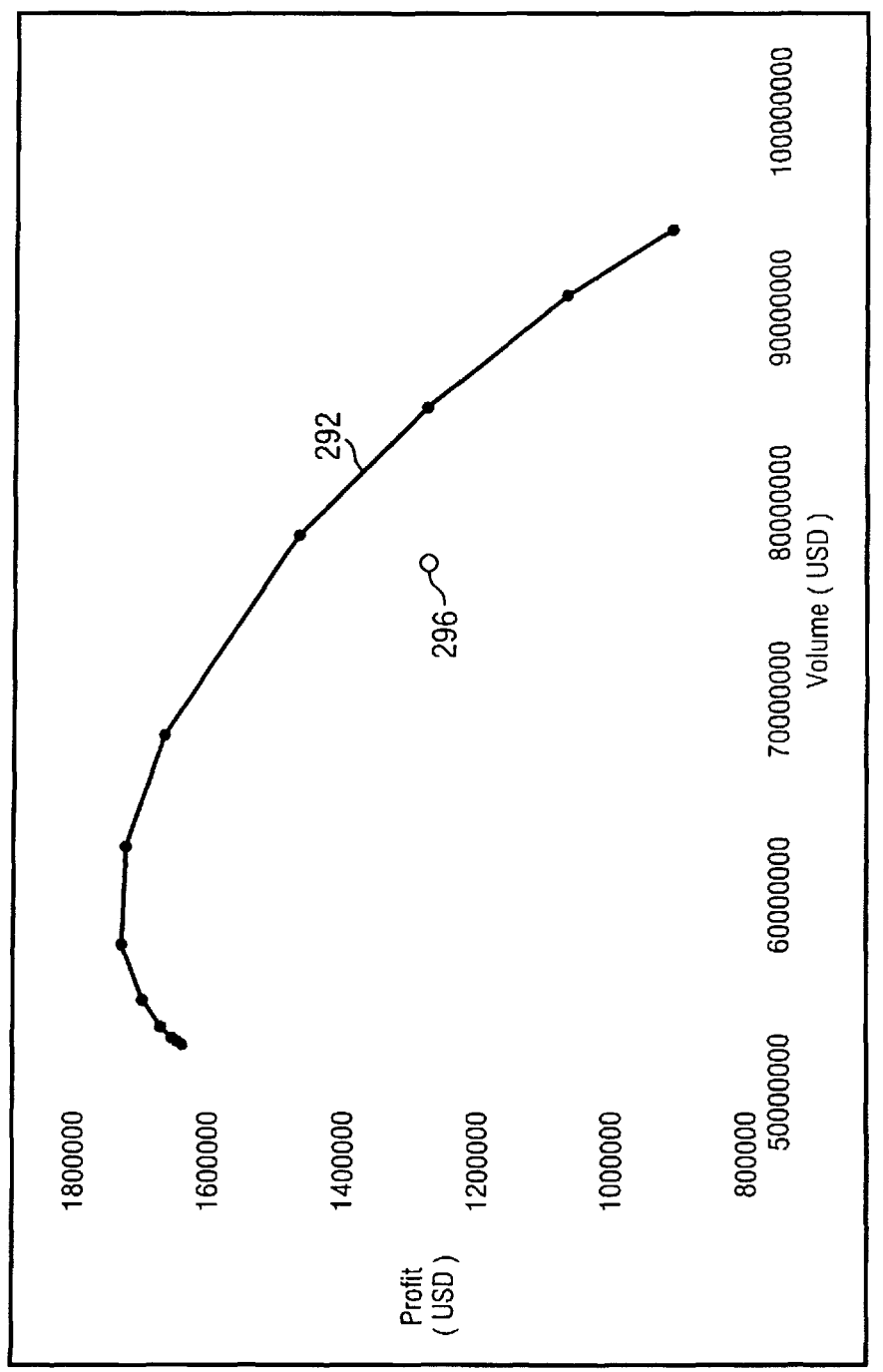
FIG. 20 is a graph showing re-optimized KPIs on relative scale of original KPIs.

The values used for the λ scaling factor usually also depend on the relative scale of the main KPI values. In FIG. 20, opportunity curve 292 shows, with respect to current point 296, optimized volumes are in the range of 10M, and optimized profit values are in the range 1M. So any effective tradeoff between the KPIs should involve scaling factors around −0.1, 0.1, if the λ minimum, maximum values are changed to −0.05, 0.05 and the number of points to 11.

An important consideration of optimizer 136 is computation time and resources. To reduce computation time and resources, a variety of steps can be employed that focus on the linear constraints in order to simplify the optimization models. These steps can perform a pre-solve check on the feasibility of the constraints in the optimization model before calling on the actual optimization. The pre-solver removes redundant constraints. One possible cause of a redundant constraint involves situations where the user sets no bounds on the variables. The pre-solver calculates the implied bounds on the constraints. Given the bounds on the variables l and u, it is possible to calculate the implied bounds on the constraints as a·l and a·u. These bounds can then be used to tighten the bounds on the constraints in subsequent steps. The bounds on all the constraints are tightened using their implied bounds. The pre-solver also loops between tightening bounds on variables and constraints, until no further reduction is possible.

The pre-solver can remove duplicate rows, which can occur if multiple business rules translate into similar constraints. For example, the business rules may state that pricing segments with credit score greater than 720 must have rates that are better by 50 bps when compared to segments with credit score less than 720. In addition, another rule may state that segments with customer type excellent have rates better by 50 bps compared to segments with customer type good. As each of these attribute level business rules can translate into same pricing segment KPIs, it is possible to create duplicate rows. The pre-solver checks for duplicate rows, including linearly dependent rows where one constraint is a scalar multiple of another constraint. The pre-solver keeps only one of the duplicate rows.

The pre-solver finds forcing constraints and fixed variables. The business rules set limits on the bounds of the variables that force a variable to take only one possible value. If the rate for a segment can vary between 4% and 4.5%, and a business rule enforces the rate to be strictly less than or equal to another rate that can vary between 3.5% and 4%, the only possible value for both variables is 4%. The pre-solver checks the implied bounds to see if any variable is being fixed, and removes the associated forcing constraint.

The pre-solver removes fixed and unconnected variables, which may occur due to modifications to the optimization problem. In addition, during the optimization event creation process, the user can select only a subset of all the variables. For example, in a credit card event that contains three possible variables (rate, introductory rate, and fee), the user can select only rate and introductory rate for the optimization event and keep the fee variable values fixed at the current values. One third of the total number of variables in an optimization model are fixed and by removing the fixed variables from the optimization model during the pre-solver phase, unnecessary derivative computations can be avoided thereby reducing the total computation time of the optimization.

The pre-solver removes singleton columns and rows. Any modifications to optimization model that results in only a single variable being present in a constraint, or results in a single variable being present in only one constraint, can be removed as long as the variables are not being used in the objective function or the nonlinear constraints.

The pre-solver performs scaling of the constraints. Scaling is a useful part of optimization model creation. In many scenarios of price optimization for banking, the constraints set on optimization event can include widely varying bounds. The associated segment rules set on rates usually have bounds in basis points. On the other hand, any portfolio level rules set on KPIs such as volume may have bounds in millions of dollars. Such widely varying constraints can lead to numerical problems during the computations involved in optimization techniques and/or increase the computation time due to wrongly scaled search directions involving fast convergence in certain directions and slow convergence in other directions. The pre-solver checks the bounds on all constraints set on the optimization model, as well as the level of the objective, and sets appropriate scaling factors on all numerical expressions used in the model.

Figure 21:
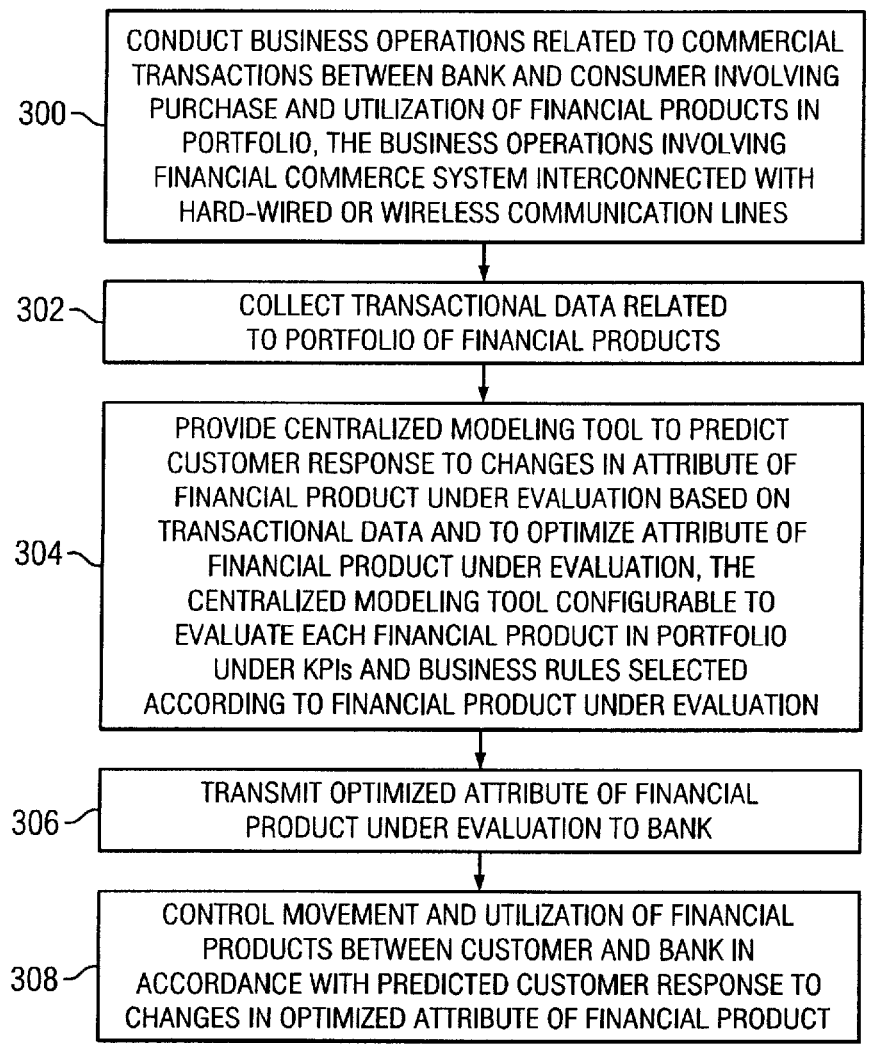
FIG. 21 illustrates a process of controlling commercial transactions involving a portfolio of financial products.

FIG. 21 illustrates a process flowchart of controlling commercial transactions involving a portfolio of financial products. The financial products include lending products, deposits, credit cards, and insurance products. In step 300, business operations related to commercial transactions are conducted between a bank and consumer involving purchase and utilization of financial products in a portfolio. The business operations involve a financial commerce system interconnected with hard-wired or wireless communication lines. In step 302, transactional data related to the portfolio of financial products is collected. In step 304, a centralized modeling and optimization tool is provided to predict customer response to changes in an attribute of a financial product under evaluation based on the transactional data and to optimize the variables of the financial product under evaluation. The centralized modeling and optimization tool is configurable to evaluate each of the financial products in the portfolio under KPIs and business rules selected according to the financial product under evaluation. The business rules, such as cell level rules, movement rules, associated segment rules, and associated variable rules, define constraints on the bank in setting pricing for the financial products. The optimization involves a trade-off between conflicting KPIs, such as profit and volume. The constraints on the KPI imposed by the business rules can be pre-solved by removing redundant and duplicate constraints on the KPI imposed by the business rules, tightening bounds on variables and constraints, handling fixed variables, and performing feasibility checks prior to optimization to increase performance. The optimization can be decomposed into a set of smaller optimization problems using separability to increase performance without losing accuracy. The optimization can be configured by user driven parameters including starting solution usage, scaling factor sequencing, algorithm selection, and derivative calculation options that increase performance and provide a tradeoff between performance and accuracy of the optimization. The optimization provides for user over-rides of optimized variable values and re-optimization of the remaining subset of variables that have not been over-ridden. In step 308, the optimized variable of the financial product under evaluation is transmitted to the bank. In step 310, the movement and utilization of the financial products between the customer and bank is controlled in accordance with the predicted customer response to changes in the optimized variable of the financial product.

While one or more embodiments of the present invention have been illustrated in detail, the skilled artisan will appreciate that modifications and adaptations to those embodiments may be made without departing from the scope of the present invention as set forth in the following claims.

What is claimed is:

1. A computer-implemented method of controlling commercial transactions involving a portfolio of financial products, comprising:
    conducting business operations related to commercial transactions between a bank and consumer via a communication control link, the commercial transactions involving purchase and utilization of financial products in a portfolio, the business operations involving a financial commerce system interconnected with hard-wired or wireless communication lines;
    collecting, by a control system under processor control, transactional data related to the portfolio of financial products;
    providing a centralized modeling and optimization tool configured to predict customer response to changes in an attribute of a financial product under evaluation based on the transactional data and to optimize the attribute of the financial product under evaluation, the centralized modeling and optimization tool further configured to evaluate each of the financial products in the portfolio under key performance indicators (KPIs) and business rules selected according to the financial product under evaluation, the centralized modeling and optimization tool including a metrics engine configured to perform the evaluation of the KPIs and the business rules using objective functions stored in a shared library;
    the evaluation including:
        generating a plurality of goal management curves with axes representing pairs of KPIs;
        applying a changeable scaling factor in an iterative manner to each of the plurality of goal management curves, wherein the changeable scaling factor changes for each iteration and an optimal solution scaling factor is a starting point for the changeable scaling factor of a subsequent iteration;
        pre-solving optimization models by removing redundant and duplicate constraints on the KPI imposed by the business rules;
    transmitting the optimized attribute of the financial product under evaluation to the bank; and
    controlling movement and utilization of the financial products between the customer and bank in accordance with the predicted customer response to changes in the optimized attribute of the financial product.

2. The computer-implemented method of claim 1, wherein the business rules define constraints on the bank in setting pricing for the financial products.

3. The computer-implemented method of claim 1, wherein the business rules include as cell level rules, movement rules, associated segment rules, associated variable rules, and portfolio level rules.

4. The computer-implemented method of claim 1, wherein the optimization involves a trade-off between conflicting KPIs.

5. The computer-implemented method of claim 1, wherein the optimization creates a graphical representation of a trade-off between KPIs.

6. The computer-implemented method of claim 1, further including tightening bounds on variables and constraints, handling fixed variables, and performing feasibility checks prior to optimization to increase performance.

7. The computer-implemented method of claim 1, further including decomposing the optimization problem into a set of smaller optimization problems using separability to increase performance without losing accuracy.

8. The computer-implemented method of claim 1, wherein the optimization can be configured by user driven parameters including starting solution usage, scaling factor sequencing, algorithm selection, and derivative calculation options that increase performance and provide a tradeoff between performance and accuracy of the optimization.

9. The computer-implemented method of claim 1, further including the step of providing user over-rides of optimized variable values, and re-optimizing variables that have not been over-ridden.

10. A computer-implemented method of controlling commercial transactions involving a portfolio of financial products, comprising:
    conducting via a communication control link, business operations related to commercial transactions involving purchase and utilization of financial products in a portfolio between members of a financial commerce system;
    collecting, by a control system under processor control, transactional data related to the portfolio of financial products;
    providing a centralized modeling and optimization tool configured to predict member response to changes in an attribute of a financial product under evaluation based on the transactional data and to optimize the attribute of the financial product under evaluation, the centralized modeling and optimization tool further configured to evaluate each of the financial products in the portfolio under key performance indicators (KPIs) and business rules selected according to the financial product under evaluation, the centralized modeling and optimization tool including a metrics engine configured to perform the evaluation of the KPIs and the business rules using objective functions stored in a shared library;
    the evaluation including:
        generating a plurality of goal management curves with axes representing pairs of KPIs;

applying a changeable scaling factor in an iterative manner to each of the plurality of goal management curves, wherein the changeable scaling factor changes for each iteration and an optimal solution scaling factor is a starting point for the changeable scaling factor of a subsequent iteration;

pre-solving optimization models by removing redundant and duplicate constraints on the KPI imposed by the business rules;

transmitting the optimized attribute of the financial product under evaluation to a member of the financial commerce system; and controlling movement and utilization of the financial products between the members of the financial commerce system in accordance with the predicted response to changes in the optimized attribute of the financial product.

11. The computer-implemented method of claim 10, wherein the financial products include lending products, deposits, credit cards, and insurance products.

12. The computer-implemented method of claim 10, wherein the business rules define constraints on the bank in setting pricing for the financial products.

13. The computer-implemented method of claim 10, wherein the business rules include as cell level rules, movement rules, associated segment rules, associated variable rules, and portfolio level rules.

14. The computer-implemented method of claim 10, wherein the optimization involves a trade-off between conflicting KPIs.

15. A non-transitory computer readable medium having stored thereon instructions which when executed by a processor cause the processor to implement a method of controlling commercial transactions involving a portfolio of financial products, the method comprising:

conducting business operations related to commercial transactions involving purchase and utilization of financial products in a portfolio between members of a financial commerce system;

collecting transactional data related to the portfolio of financial products;

providing a centralized modeling and optimization tool to predict member response to changes in an attribute of a financial product under evaluation based on the transactional data and to optimize the attribute of the financial product under evaluation, the centralized modeling and optimization tool being configurable to evaluate each of the financial products in the portfolio under key performance indicators (KPIs) and business rules selected according to the financial product under evaluation, the centralized modeling and optimization tool including a metrics engine configured to perform the evaluation of the KPIs and the business rules using objective functions stored in a shared library;

the evaluation including:

generating a plurality of goal management curves with axes representing pairs of KPIs;

applying a changeable scaling factor in an iterative manner to each of the plurality of goal management curves, wherein the changeable scaling factor changes for each iteration and an optimal solution scaling factor is a starting point for the changeable scaling factor of a subsequent iteration;

pre-solving optimization models by removing redundant and duplicate constraints on the KPI imposed by the business rules;

transmitting the optimized attribute of the financial product under evaluation to a member of the financial commerce system; and controlling movement and utilization of the financial products between the members of the financial commerce system in accordance with the predicted response to changes in the optimized attribute of the financial product.

16. The medium of claim 15, wherein the business rules define constraints on the bank in setting pricing for the financial products.

17. The medium of claim 15, wherein the business rules include as cell level rules, movement rules, associated segment rules, associated variable rules, and portfolio level rules.

18. The medium of claim 15, wherein the optimization involves a trade-off between conflicting KPIs.

19. The medium of claim 15, further including pre-solving constraints on the KPI imposed by the business rules prior to optimization to increase performance.

20. A system for controlling commercial transactions using a forecast of demand based on transactional data and supply data, comprising:

a financial commerce system having a plurality of members each having a control system for controlling movement and utilization of financial products between the members;

a database in electronic communication with the financial commerce system for recording transactional data related to movement of financial products between the members of the financial commerce system;

a computer in electronic communication with the financial commerce system and providing a centralized modeling and optimization tool to predict member response to changes in an attribute of a financial product under evaluation based on the transactional data and to optimize the attribute of the financial product under evaluation, the centralized modeling and optimization tool being configurable to evaluate each of the financial products in the portfolio under key performance indicators (KPIs) and business rules selected according to the financial product under evaluation;

the centralized modeling and optimization tool including a metrics engine configured to perform the evaluation of the KPIs and the business rules using objective functions stored in a shared library;

the centralized modeling and optimization tool including an optimizer configured to perform the evaluation by generating a plurality of goal management curves with axes representing pairs of KPIs, and applying a changeable scaling factor in an iterative manner to each of the plurality of goal management curves, wherein the changeable scaling factor changes for each iteration and an optimal solution scaling factor is a starting point for the changeable scaling factor of a subsequent iteration;

the optimizer configured to pre-solve optimization models by removing redundant and duplicate constraints on the KPI imposed by the business rules; and wherein the optimized attribute of the financial product under evaluation controls movement and utilization of the financial products between the members of the financial commerce system in accordance with the predicted response to changes in the optimized attribute of the financial product.

21. The system of claim 20, wherein the business rules define constraints on the bank in setting pricing for the financial products.

22. The system of claim 20, wherein the business rules include as cell level rules, movement rules, associated segment rules, associated variable rules, and portfolio level rules.

23. The system of claim 20, wherein the optimization involves a trade-off between conflicting KPIs.

* * * * *